US012785280B2

(12) United States Patent
Yun et al.

(10) Patent No.: US 12,785,280 B2
(45) Date of Patent: Nov. 3, 2026

(54) WEARABLE DEVICE COMPRISING ANTENNA WITHIN TRANSPARENT MEMBER

(71) Applicant: Samsung Electronics Co., Ltd., Suwon-si (KR)

(72) Inventors: Sumin Yun, Suwon-si (KR); Hosaeng Kim, Suwon-si (KR); Seongjin Park, Suwon-si (KR); Woomin Jang, Suwon-si (KR); Jehun Jong, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/775,647

(22) Filed: Jul. 17, 2024

(65) Prior Publication Data

US 2024/0372261 A1 Nov. 7, 2024

Related U.S. Application Data

(63) Continuation of application No. PCT/KR2023/000173, filed on Jan. 4, 2023.

(30) Foreign Application Priority Data

Jan. 17, 2022 (KR) ........................ 10-2022-0006661
Mar. 2, 2022 (KR) ........................ 10-2022-0027054

(51) Int. Cl.
*H01Q 1/27* (2006.01)
*H01Q 9/04* (2006.01)

(52) U.S. Cl.
CPC ............ *H01Q 9/045* (2013.01); *H01Q 1/273* (2013.01); *H01Q 9/0442* (2013.01)

(58) Field of Classification Search
CPC ...... H01Q 9/045; H01Q 1/273; H01Q 9/0442; H01Q 9/40; H01Q 1/38; G02B 5/3058;
(Continued)

(56) References Cited

U.S. PATENT DOCUMENTS 7,847,753 B2 12/2010 Ishibashi et al.
9,024,830 B2 5/2015 Okajima et al.
(Continued)

FOREIGN PATENT DOCUMENTS

CN 112201946 A 1/2021
JP 2017175439 A 9/2017
(Continued)

OTHER PUBLICATIONS

International Search Report dated Apr. 11, 2023, issued in International Patent Application No. PCT/KR2023/000173.
(Continued)

*Primary Examiner* — David E Lotter
(74) *Attorney, Agent, or Firm* — Jefferson IP Law, LLP

(57) ABSTRACT

A wearable device is provided. The wearable device includes a transparent member for transferring, to a user, external light passing through a first surface and a second surface that is opposite to the first surface, a transparent substrate, within the transparent member, arranged between the first surface and the second surface, a first conductive pattern arranged on one surface of the transparent substrate facing the first surface, and a second conductive pattern arranged on another surface of the transparent substrate facing the second surface, and electrically disconnected from the first conductive pattern. The first conductive pattern includes first wires which extend in a first direction and are parallel to each other, and second wires which extend in a second direction that is different from the first direction, and
(Continued)

are parallel to each other, and is covered by the second conductive pattern when the transparent substrate is viewed.

20 Claims, 20 Drawing Sheets

(58) Field of Classification Search
CPC .......... G02B 27/017; G02B 2027/0178; G06F 2203/04108; G06F 1/163; G06F 3/016; G06F 3/03547; G06F 3/0445; G06F 3/0446; G02C 11/10
See application file for complete search history.

(56) References Cited

U.S. PATENT DOCUMENTS

| | | | | |
|---|---|---|---|---|
| 9,547,335 | B1 | 1/2017 | Bevelacqua et al. | |
| 2014/0240474 | A1* | 8/2014 | Kondo | H04B 1/385 348/56 |
| 2015/0198806 | A1* | 7/2015 | Jin | H01Q 1/44 345/8 |
| 2017/0139520 | A1 | 5/2017 | Yeh et al. | |
| 2017/0279955 | A1 | 9/2017 | Togashi | |
| 2021/0080749 | A1* | 3/2021 | Iwasaki | G02C 7/04 |
| 2021/0219147 | A1 | 7/2021 | Mizunuma et al. | |
| 2023/0199096 | A1 | 6/2023 | Yun et al. | |

FOREIGN PATENT DOCUMENTS

| | | | |
|---|---|---|---|
| JP | 2019149168 | A | 9/2019 |
| KR | 10-2017-0072085 | A | 6/2017 |
| KR | 10-2020-0097254 | A | 8/2020 |
| KR | 10-2230167 | B1 | 3/2021 |
| WO | 2022/035170 | A1 | 2/2022 |

OTHER PUBLICATIONS

European Search Report dated Mar. 21, 2025, issued in European Application No. 23740386.0.
Indian Office Action dated Apr. 8, 2026, issued in Indian Application No. 202417061572.
Korean Office Action dated Jun. 1, 2026, issued in Korean Application No. 10-2022-0027054.
Indian Hearing Notice dated Aug. 4, 2026, issued in Indian Application No. 202417061572.

* cited by examiner

210: 211(211a, 211b), 213, 215(215a, 215b)
230: 230a, 230b

WEARABLE DEVICE COMPRISING ANTENNA WITHIN TRANSPARENT MEMBER

CROSS-REFERENCE TO RELATED APPLICATION(S)

This application is a continuation application, claiming priority under § 365(c), of an International application No. PCT/KR2023/000173, filed on Jan. 4, 2023, which is based on and claims the benefit of a Korean patent application number 10-2022-0006661, filed on Jan. 17, 2022, in the Korean Intellectual Property Office, and of a Korean patent application number 10-2022-0027054, filed on Mar. 2, 2022, in the Korean Intellectual Property Office, the disclosure of each of which is incorporated by reference herein in its entirety.

BACKGROUND

1. Field

The disclosure relates to a wearable device including an antenna within a transparent member.

2. Description of Related Art

A wearable device may be worn on a part of a user's body to be used from time to time for a short period of time. Wearable devices may be provided in various forms of products. For example, a wearable device may include an eyewear type of device for providing augmented reality (AR) or virtual reality (VR) to a user.

A wearable device formed as an eyewear type of device may include a transparent member disposed at a position corresponding to a user's eye and a frame capable of supporting the transparent member. In addition to the transparent member in which a display is disposed, most of electronic components of the wearable device may be mounted in the frame.

The above information is presented as background information only to assist with an understanding of the disclosure. No determination has been made, and no assertion is made, as to whether any of the above might be applicable as prior art with regard to the disclosure.

SUMMARY

An eyeglass type of wearable device may have components mounted in a frame, thereby causing an electrical interference to occur from those components.

Aspects of the disclosure are to address at least the above-mentioned problems and/or disadvantages and to provide at least the advantages described below. Accordingly, an aspect of the disclosure is to provide a wearable device that has an antenna radiator disposed on a transparent member corresponding to an eyeglass lens so as to reduce or alleviate an electrical interference from the components in the frame.

Additional aspects will be set forth in part in the description which follows and, in part, will be apparent from the description, or may be learned by practice of the presented embodiments.

In accordance with an aspect of the disclosure, a wearable device is provided. The wearable device includes a transparent member, while the wearable device is worn by a user, transmitting external light passing through a first side and a second side opposite to the first side to the user, a transparent substrate, in the transparent member, disposed between the first side and the second side, a first conductive pattern disposed on a side of the transparent substrate facing the first side of the transparent member, a second conductive pattern disposed on another side of the transparent substrate facing the second side of the transparent member and electrically disconnected from the first conductive pattern, and at least one processor electrically connected with the first conductive pattern and configured to communicate with an external electronic device through the first conductive pattern.

According to an embodiment, the first conductive pattern includes first wires, extending in a first direction, parallel to each other and second wires, extending in a second direction different from the first direction, parallel to each other.

According to an embodiment, the first conductive pattern is surrounded by the second conductive pattern, when the transparent substrate is viewed.

In accordance with another aspect of the disclosure, a wearable device is provided. The wearable device includes at least one transparent display, when the wearable device is worn by a user, configured to transmit external light facing a first side through a second side opposite to the first side and display information on the second side, a transparent substrate disposed in the at least one transparent display, a first conductive pattern disposed on a third side of the transparent substrate, in a portion of a first region of the transparent substrate, a second conductive pattern disposed on a fourth side opposite to the third side, in a remaining portion of the first region and a second region of the transparent substrate, and at least one processor configured to be electrically connected to the first conductive pattern and to communicate with an external electronic device through the first conductive pattern.

According to an embodiment, a thickness of the first conductive pattern and the second conductive pattern disposed on the first region is greater than a thickness of the second conductive pattern disposed on the second region.

A wearable device according to an embodiment enables to avoid an electrical interference between an antenna radiator and electrical components in a frame.

A wearable device according to an embodiment reduces absorption of signals into a user's body, by providing a conductive pattern disposed on a transparent member and spaced apart from a body part of the user wearing the wearable device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
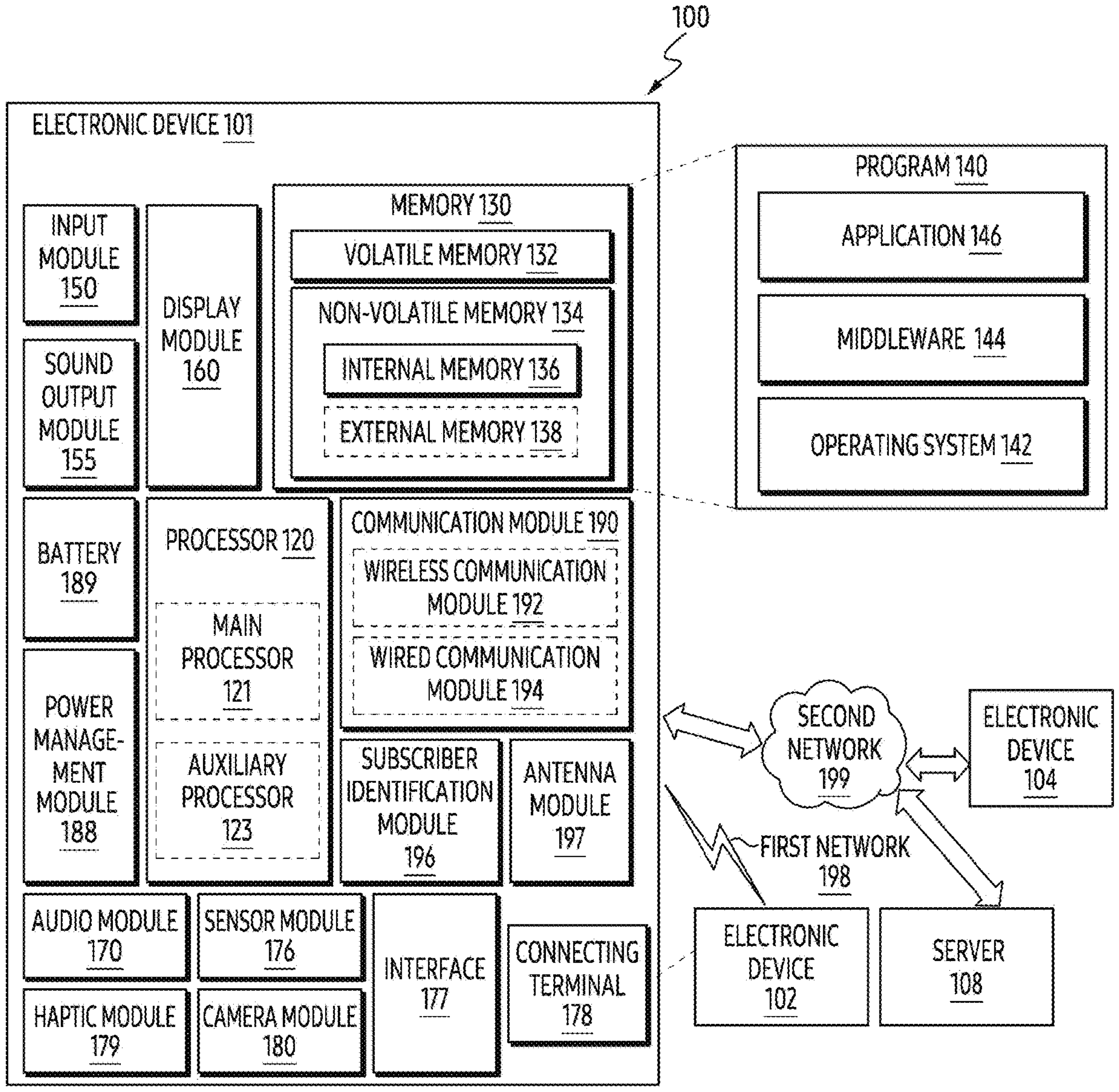
FIG. 1 is a block diagram of an electronic device in a network environment according to an embodiment of the disclosure.

FIG. 1 is a block diagram of an electronic device 100 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., a bottom surface) of the printed circuit board, or adjacent to the first surface and capable of supporting a designated high-frequency band (e.g., the mmWave band), and a plurality of antennas (e.g., array antennas) disposed on a second surface (e.g., a top surface or a side portion) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
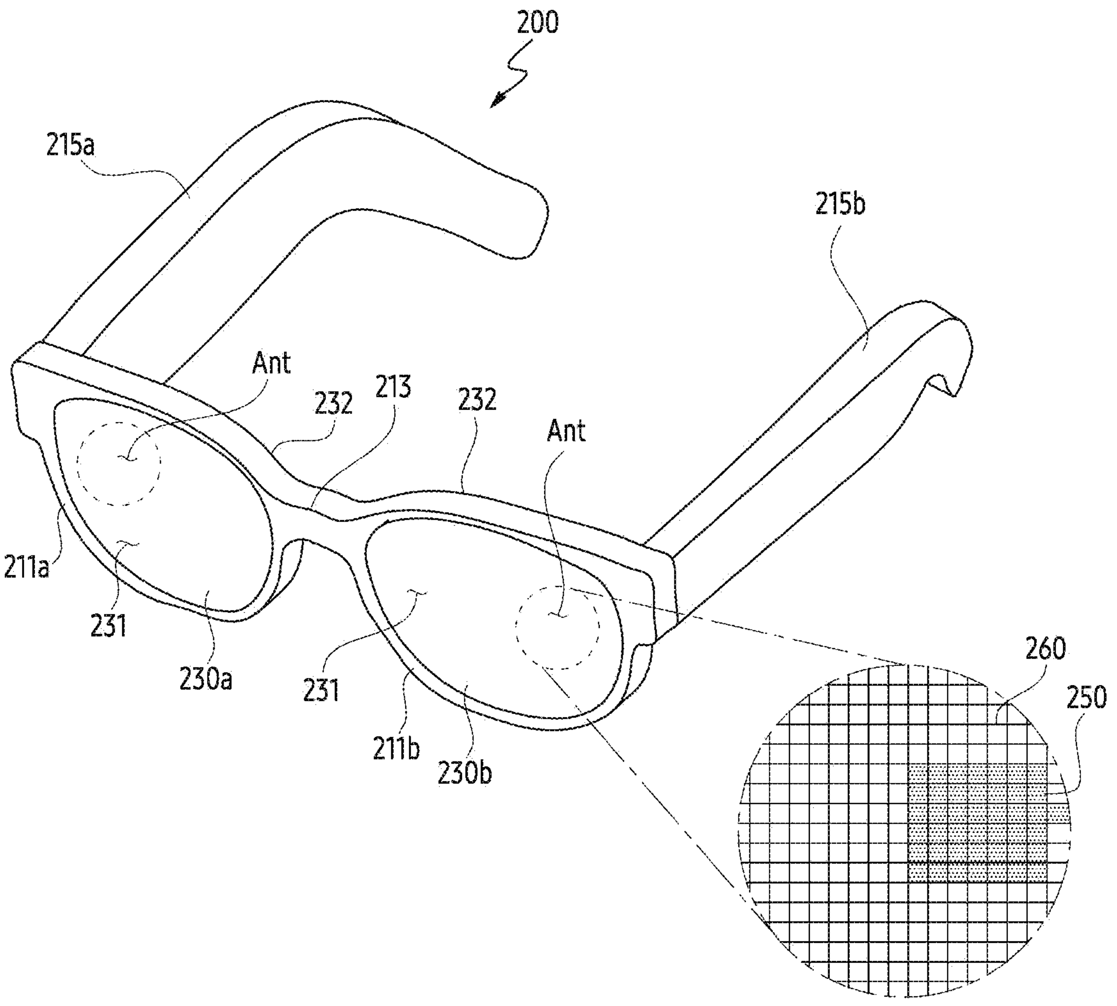
FIG. 2 is a perspective view of an example wearable device according to an embodiment of the disclosure.

FIG. 2 is a perspective view of a wearable device 200 according to an embodiment of the disclosure.

Figure 3:
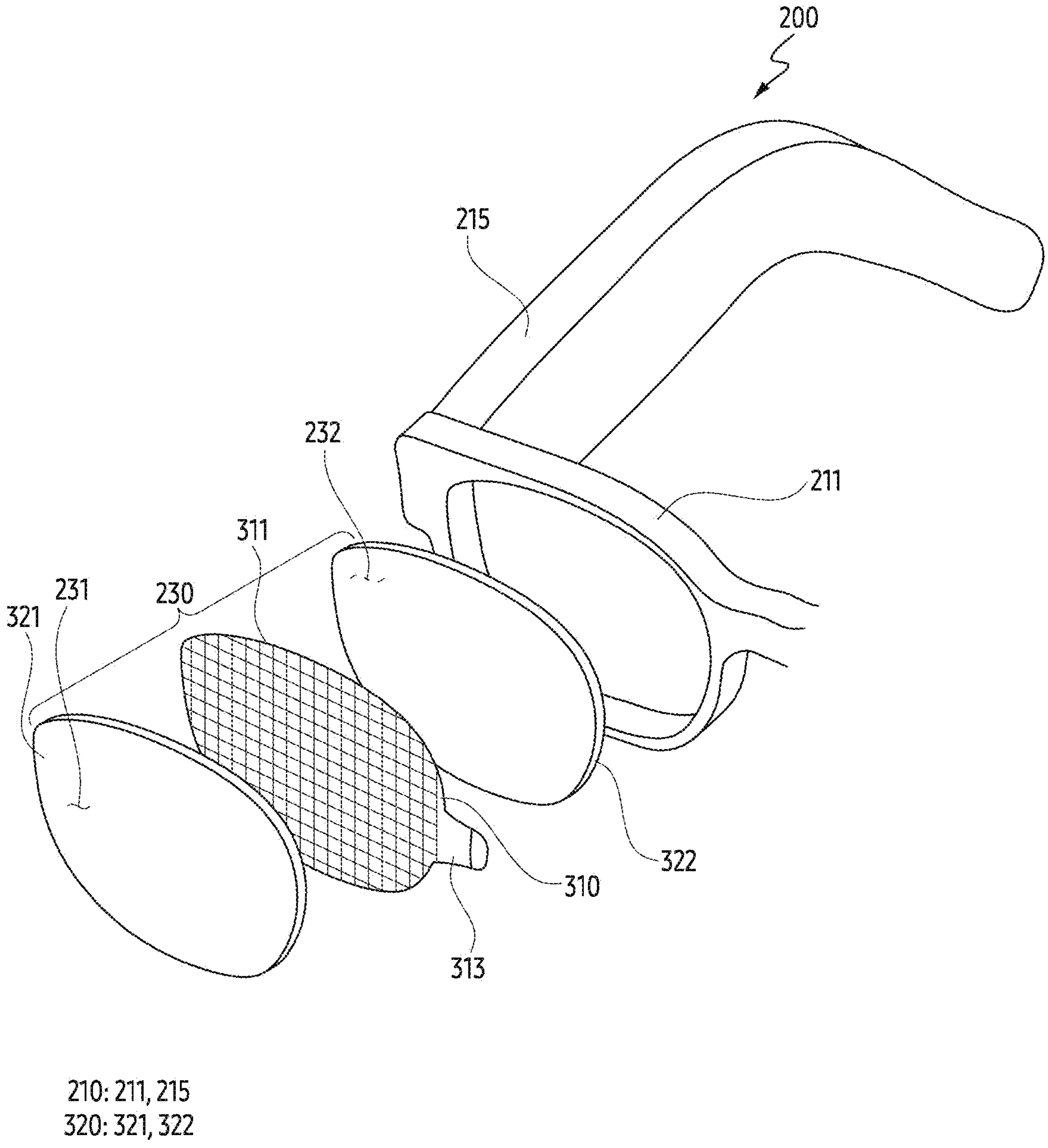
FIG. 3 is an exploded perspective view of an example wearable device according to an embodiment of the disclosure.

FIG. 3 is an exploded perspective view of the wearable device according to an embodiment of the disclosure.

Referring to FIGS. 2 and 3, the wearable device 200 may include a frame 210 and a display 230. The wearable device 200 may be referred to as the electronic device 101 of FIG. 1. The wearable device 200 may be an electronic device worn and used on a part of the user's body. For example, the wearable device 200 may be worn on the user's face. When the wearable device 200 is worn on the user, image information or audio information may be provided to the user. The wearable device 200 may be an augmented reality (AR) glasses for providing the user with an image using external light transmitted through a transparent member 320 of the display 230 and provides visual information to the user through the display 230. For example, the wearable device 200 may provide the user with an image in which a virtual image transmitted through the display 230 is superimposed on a real image or background.

According to an embodiment, the frame 210 may support the display 230. An empty space is formed inside the frame 210, so the frame 210 may include various electronic components within the empty space. The frame 210 may be formed in the same shape as an eyeglasses frame. The frame 210 may include various components such as a rim 211, a bridge 213, and/or a temple 215. These components may be omitted or added as desired. For example, the frame 210 may include a hinge pivotably coupled to a temple 215. The frame 210 may omit the bridge 213.

According to an embodiment, the rim 211 may be disposed along a periphery of the display 230 to fix the display 230. The rim 211 may include a first rim 211*a* and a second rim 211*b*. The rim 211 may be formed such that the display 230 is placed at a position corresponding to the user's eyes when the user wears the wearable device 200. When the user wears the wearable device 200, the first rim 211*a* may be formed such that a first display 230*a* supported by the first rim 211*a* is positioned at a position corresponding to the user's right eye, and a second rim 211*b* may be disposed such that a second display 230*b* supported by the second rim 211*b* is positioned at a position corresponding to the user's left eye.

According to an embodiment, the bridge 213 may connect the first rim 211*a* and the second rim 211*b*. The bridge 213 may support the first rim 211*a* and the second rim 211*b*. The bridge 213 may be connected to a nose pad. The wearable device 200 may be supported by the nose pad disposed on a user's body part (e.g., a nose).

According to an embodiment, the temple 215 may extend from a part of the rim 211 and come into contact with another part of the user's body (e.g., an ear or a side face of a user). The temple 215 may include a first temple 215*a* and a second temple 215*b*. The first temple 215*a* may extend from another portion of the first rim 211*a* facing one portion of the first rim 211*a* connected to the bridge 213. The second temple 215*b* may extend from another portion of the second rim 211*b* facing one portion of the second rim 211*b* connected to the bridge 213. According to an embodiment, the temple 215 may be pivotably coupled to the rim 211. For example, one end of the temple 215 may be coupled to the rim 211 by means of a hinge.

According to an embodiment, while the user wears the wearable device 200, the display 230 may be configured to transmit external light facing a first side 231 through a second side 232 opposite to the first side 231. The first side 231 may be a surface facing the outside when the user wears the wearable device 200. The second side 232 may be a surface facing the user's eyes when the user wears the wearable device 200. Information provided to the user may be displayed on the second side 232 or may be transmitted to the user through the second side 232. The display 230 may include a first display 230*a* and a second display 230*b*. The first display 230*a* may be supported by the first rim 211*a*, and the second display 230*b* may be supported by the second rim 211*b*. When the user wears the wearable device 200, the first display 230*a* may be configured to be disposed at a position corresponding to the user's right eye, and the second display 230*b* may be configured to be disposed at a position corresponding to the user's left eye.

According to an embodiment, the display 230 may include conductive patterns. The conductive patterns disposed in the display 230 may be a first conductive pattern 250 and a second conductive pattern 260 that perform different functions from each other. For example, the first conductive pattern 250 may be an antenna pattern operating as an antenna radiator disposed in the antenna region Ant, and the second conductive pattern 260 may be a dummy pattern disposed to reduce the degree of identification of a region in which the first conductive pattern 250 is disposed. As another example, the first conductive pattern 250 may be an antenna pattern operating as an antenna radiator, and the second conductive pattern 260 may be a touch pattern to detect an external input. The first conductive pattern 250 may be covered with the second conductive pattern 260.

Referring to FIG. 3, the wearable device 200 may include a transparent member 320, a transparent substrate 310, and a wire set 311.

According to an embodiment, the display 230 may include a transparent member 320. While the user wears the wearable device 200, the transparent member 320 may transmit external light passing through the first side 231 and the second side 232 to the user. The transparent member 320 may be formed of at least one of a polymer material such as e.g., polycarbonate (PC), polymethyl methacrylate (PMMA), polyimide (PI), polyethylene terephthalate (PET), polypropylene terephthalate (PPT), polypropylene terephthalate (PET) or the like or glass. According to an embodiment, the transparent member 320 may include a multilayer structure consisting of various materials.

According to an embodiment, the transparent member 320 may include a first transparent region 321 forming the first side 231 and a second transparent region 322 forming the second side 232. Each of the first transparent region 321 and the second transparent region 322 may be formed of a transparent layer and bonded to each other. The first transparent region 321 and the second transparent region 322 may be integrally formed.

According to an embodiment, the wire set 311 forming the first conductive pattern 250 and/or the second conductive pattern 260 disposed in the display 230 may be disposed between the first transparent region 321 and the second transparent region 322. The wire set 311 may be disposed on the transparent substrate 310. For example, the wire set 311 may be printed on one surface of the transparent substrate 310. As another example, the wire set 311 may be pressed or attached to be fixed onto one surface of the transparent substrate 310. It may be configured to transmit only a portion of external light facing the first side 231 to the second side 232. The wearable device 200 including the wire set 311 may be configured to transmit only a portion of external light to be used as sunglasses. A part of the wire set 311 may be used as an antenna, and the antenna may be electrically connected to a processor (e.g., the processor 120, the communication processor, or the wireless communication circuit of FIG. 1) through a flexible printed circuit board 313. The flexible printed circuit board 313 may extend from a periphery of the display 230, on which the wire set 311 is disposed, to the bridge 213 or the temple 215.

According to the above-described embodiment, the wearable device 200 such as AR glasses may require a space enough to install many antennas for communication (e.g., wireless fidelity (Wi-Fi), Bluetooth (BT), long term evolution (LTE), or 5G). Bulky components such as a battery and a printed circuit board are disposed in the temple 215, which provides most of the space of the frame 210, and sensors are disposed in the rim 211 or the bridge 213, thereby resulting in an insufficient mounting space for antennas. The wearable device 200 according to an embodiment may secure more mounting space for the antennas by placing the antennas within the display 230 or the transparent member 320.

In order to arrange various components (e.g., a battery, a substrate, a memory, or a camera) in the frame 210 for driving the wearable device 200 according to an embodiment, some components may be disposed outside the frame 210. The wearable device 200 may use some of the wire set 311 (e.g., the first conductive pattern 250) as an antenna. The first conductive pattern 250 may be disposed in the display 230 or the transparent member 320, not the frame 210. The first conductive pattern 250 used as an antenna may reduce electrical interference with components disposed in the frame 210.

According to an embodiment, the wearable device 200 may be disposed in an area (e.g., the display 230 or the transparent member 320) other than the frame 210 in contact with a part of the user's body while the user wears the wearable device, so that there is less change in impedance due to the user's body and less deterioration of antenna performance.

Figure 4:
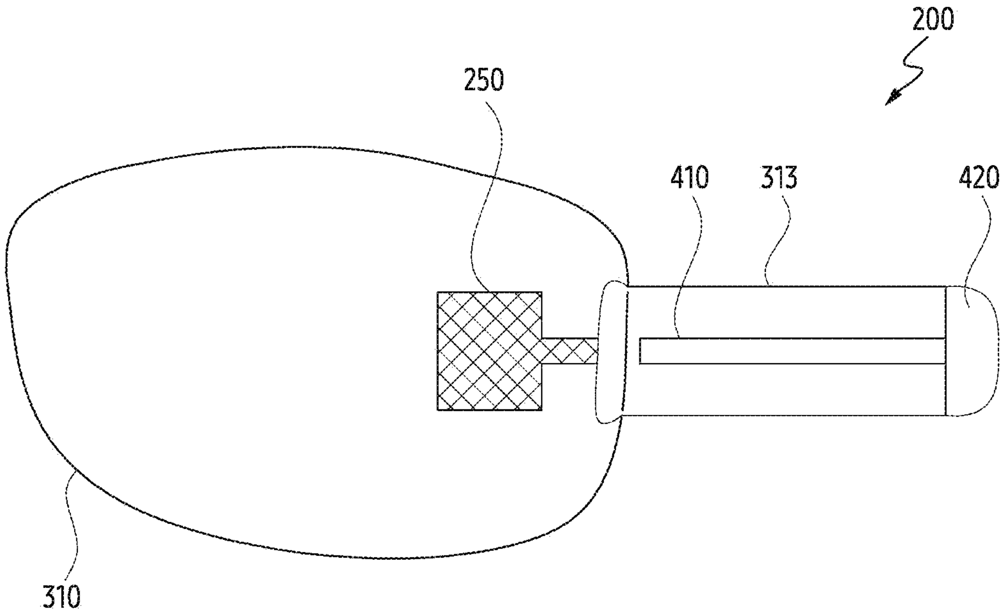
FIG. 4 is a diagram illustrating an arrangement of an antenna pattern and a power feeding substrate according to an embodiment of the disclosure.

FIG. 4 illustrates an arrangement of an antenna pattern and a power feeding substrate according to an embodiment of the disclosure.

Referring to FIG. 4, the wearable device 200 may include a flexible printed circuit board 313 including a transparent substrate 310, a first conductive pattern 250, a power feeding line 410, and a connector.

According to an embodiment, the first conductive pattern 250 may form an antenna pattern with a plurality of wires. The first conductive pattern 250 may include a plurality of wires arranged in a mesh shape. The first conductive pattern 250 including mesh-shaped wires may be implemented as an antenna. For example, the first conductive pattern 250 may be implemented as a monopole antenna or a patch antenna.

According to an embodiment, the first conductive pattern 250 may be disposed on the transparent substrate 310. The first conductive pattern 250 implemented as a monopole antenna may be disposed on one surface of the transparent substrate 310, and a ground pattern may be disposed on the one surface of the transparent substrate 310. According to an embodiment, the first conductive pattern 250 implemented as a patch antenna may be disposed on one surface of the transparent substrate 310, and a ground pattern may be disposed on another surface opposite to the one surface of the transparent substrate 310.

According to an embodiment, the first conductive pattern 250 may be fed with power through a power feeding line 410 disposed on the flexible printed circuit board 313. The flexible printed circuit board 313 may be electrically or indirectly connected to the printed circuit board through a connector 420. The first conductive pattern 250 may receive current related to a signal received from the processor 120 through the power feeding line 410. For example, the processor 120 may be configured to feed power to the first conductive pattern 250 through the flexible printed circuit board 313 and communicate with an external electronic device distinct from the wearable device 200 through the first conductive pattern 250.

Figure 5A:
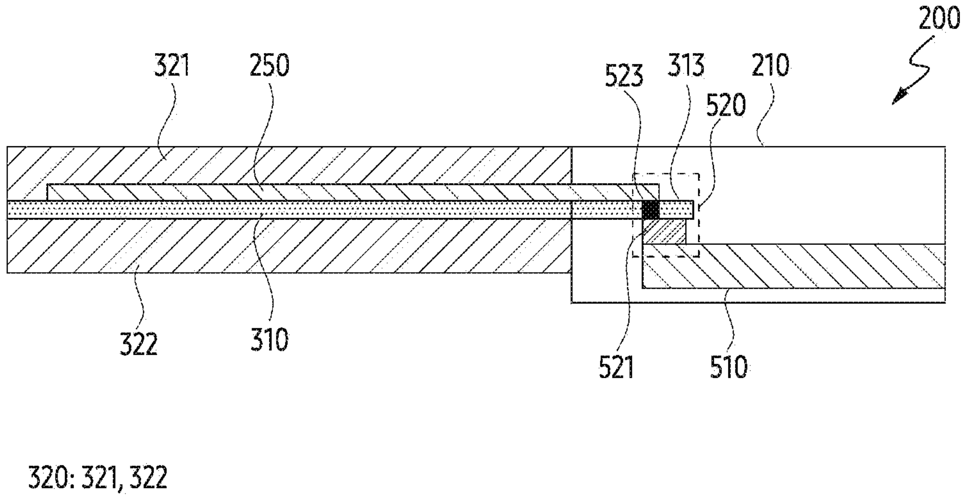
FIG. 5A illustrates an example of a structure for feeding power to an antenna structure according to an embodiment of the disclosure.

FIG. 5A illustrates an example of a structure for feeding power to an antenna structure according to an embodiment of the disclosure.

Figure 5B:
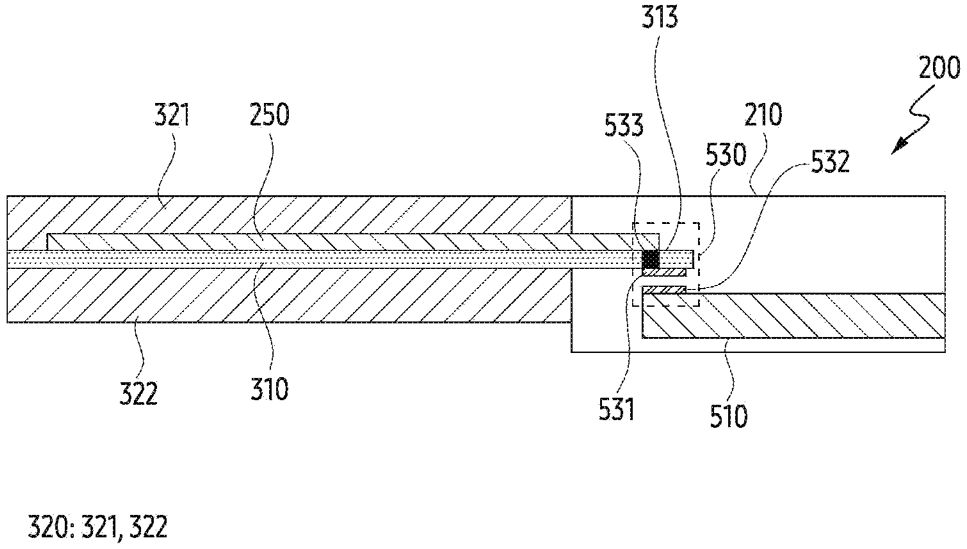
FIG. 5B illustrates another example of a structure for feeding power to an antenna structure according to an embodiment of the disclosure.

FIG. 5B illustrates another example of a structure for feeding power to an antenna structure according to an embodiment of the disclosure.

Referring to FIGS. 5A and 5B, the wearable device 200 may include a frame 210, a transparent member 320, a first conductive pattern 250, a power feeding line 410, and a printed circuit board 510.

According to an embodiment, the transparent substrate 310 may be disposed in the transparent member 320. The first conductive pattern 250 may be disposed on one surface of the transparent substrate 310 and may be located in the transparent member 320. The transparent substrate 310 may be disposed on the second transparent region 322 of the transparent member 320. The first conductive pattern 250 may be printed on the transparent substrate 310 in a mesh form.

According to an embodiment, the first conductive pattern 250 may be electrically connected to the printed circuit board 510 through the flexible printed circuit board 313. For example, the transparent member 320 including the first conductive pattern 250 may extend to form the flexible printed circuit board 313. The first conductive pattern 250 may be electrically connected to the printed circuit board 510 through a connector 520 at one end of the flexible printed circuit board 313. The first conductive pattern 250 may be connected to a wireless communication circuit (or a communication processor) disposed on the printed circuit board 510 to operate as an antenna radiator.

Referring to FIG. 5A, the processor (e.g., the processor 120 of FIG. 1) may be electrically connected to the printed circuit board 510 on which the processor 120 is disposed, in order to feed power to the first conductive pattern 250 implemented as an antenna. The connector 520 of the flexible printed circuit board 313 may include a connector 521. The first conductive pattern 250 may be connected to the connector 521 through a conductive via 523. The conductive via 523 may be formed to penetrate both surfaces of the flexible printed circuit board 313 and may be disposed in a region where the connector 521 and the first conductive pattern 250 face each other. The conductive via 523 may electrically connect the connector 521 and the first conductive pattern 250. The first conductive pattern 250 may be connected to the printed circuit board 510 through the connector 521 to be directly fed with power. According to an embodiment, the connector 520 of the flexible printed circuit board 313 may be connected to the printed circuit board 510 through soldering. For example, the first conductive pattern 250 may be soldered and connected to the printed circuit board 510 to be directly fed with power.

Referring back to FIG. 5B, the connector 530 of the flexible printed circuit board 313 may include a first conductive pad 531. The printed circuit board 510 may include a second conductive pad 532 in a region facing the first conductive pad 531. The first conductive pattern 250 may be connected to the first conductive pad 531 through a conductive via 533. The conductive via 533 may be formed to penetrate both surfaces of the flexible printed circuit board 313 and may be disposed in a region where the first conductive pad 531 and the first conductive pattern 250 face each other. The conductive via 533 may electrically connect the first conductive pad 531 and the first conductive pattern 250. The first conductive pad 531 and the second conductive pad 532 may be coupled to each other during power feeding. The first conductive pattern 250 may be indirectly connected to the first conductive pad 531 through the second conductive pad 532, thereby making indirect power feeding thereto.

Figure 6A:
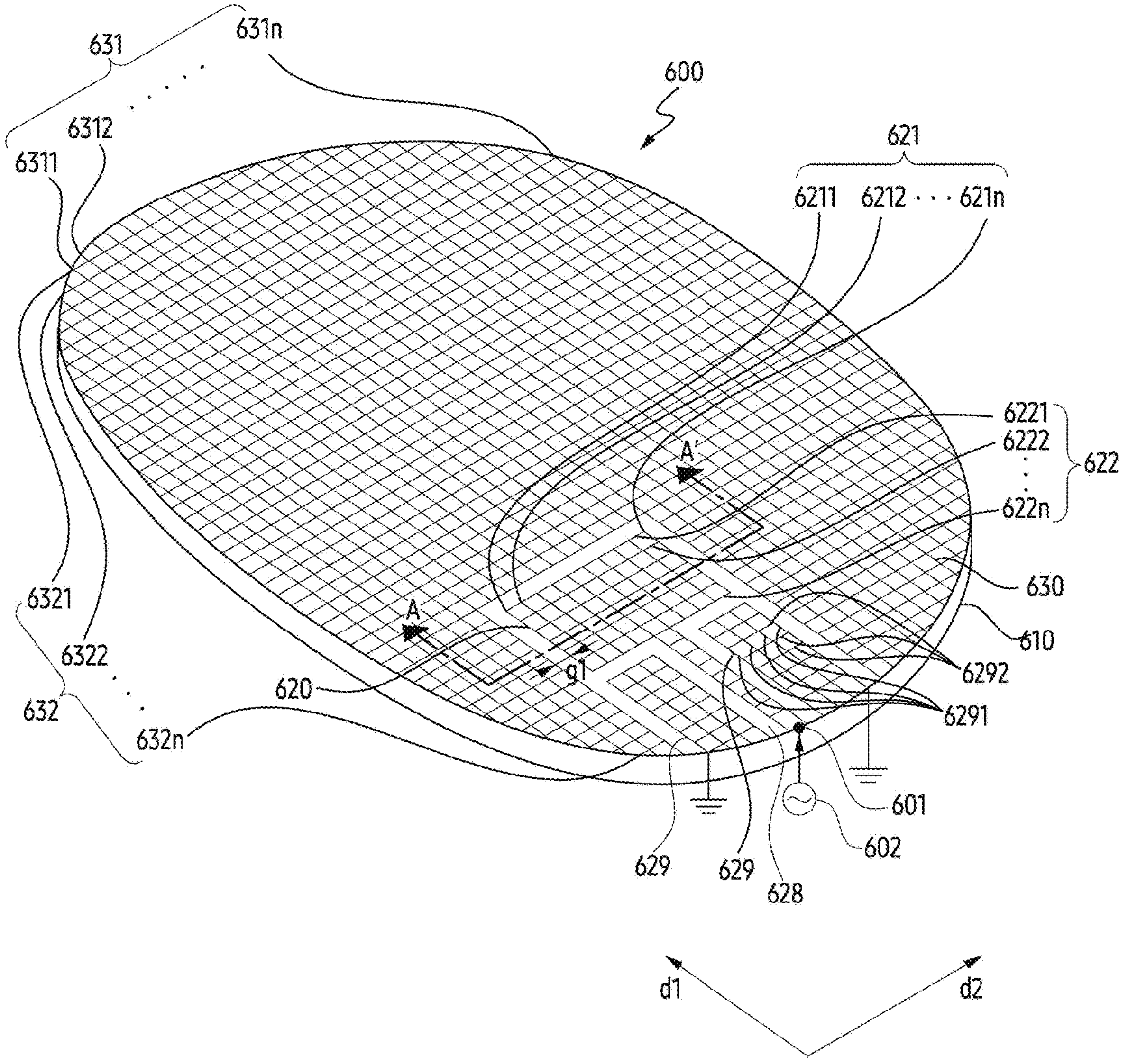
FIG. 6A illustrates an example of a monopole antenna disposed on a transparent substrate according to an embodiment of the disclosure.

FIG. 6A illustrates an example of a monopole antenna disposed on a transparent substrate according to an embodiment of the disclosure.

Figure 6B:
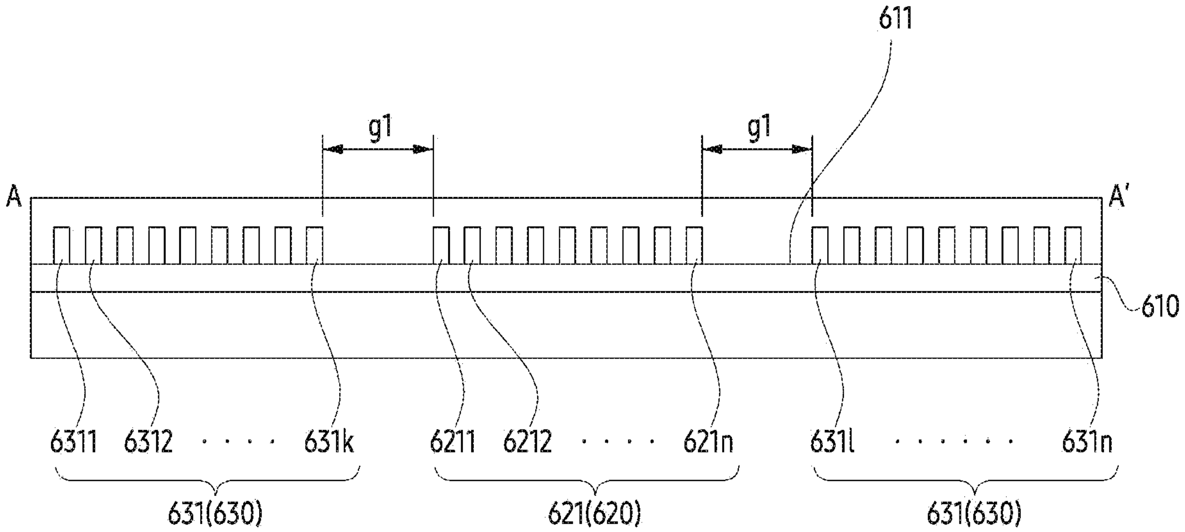
FIG. 6B is a cross-sectional view of the transparent substrate of FIG. 6A taken along line A-A' according to an embodiment of the disclosure.

FIG. 6B is a cross-sectional view taken along line A-A' of the transparent substrate of FIG. 6A according to an embodiment of the disclosure.

Referring to FIG. 6A, an antenna structure 600 may include a transparent substrate 610, a first conductive pattern 620, a second conductive pattern 630, and a ground pattern 629.

According to an embodiment, the antenna structure 600 may be implemented as a monopole antenna. The first conductive pattern 620, the second conductive pattern 630, and the ground pattern 629 may be printed on one surface of the transparent substrate 610. The first conductive pattern 620 may operate as a radiator of an antenna, and the ground pattern 629 may operate as a ground. The first conductive pattern 620 and the ground pattern 629 may be printed on the same surface of the transparent substrate 610. The first conductive pattern 620 and the ground pattern 629 may be electrically connected to a printed circuit board (e.g., the printed circuit board 510 of FIG. 5A) through a flexible printed circuit board (e.g., the flexible printed circuit board 313 of FIG. 3). The first conductive pattern 620 may be power fed through the processor (e.g., the processor 120 of FIG. 1) disposed on the printed circuit board 510, and the ground pattern 629 may be electrically connected to a ground in the printed circuit board 510 or a ground in the wearable device (e.g., the electronic device 101 of FIG. 1 or the wearable device 200 of FIG. 2). The first conductive pattern 620 may be disposed between the ground patterns 629 to form a coplanar waveguide (CPW) structure including a signal line passing between ground planes arranged on the same plane. The printed circuit board 510 of FIGS. 5A and/or 5B may include a ground line and a feeding line including the CPW structure. The first conductive pattern 620 may be electrically connected to the feeding line of the printed circuit board 510 through the structure of FIG. 5A or 5B, and the ground pattern 629 may be electrically connected to the ground line of the printed circuit board 510 through the structure of FIG. 5A or 5B.

According to an embodiment, the first conductive pattern 620 may include wire sets (621, 622). The first conductive pattern 620 may include a first wire set 621 extending in a first direction d1 and a second wire set 622 extending in a second direction d2. The wire sets (621, 622) may include a plurality of wires (6211, 6212, . . . 621*n*, 6221, 6222, . . . 622*n*). The wires (6211, 6212, . . . 621*n*, 6221, 6222, . . . 622*n*) may refer to a conductive pattern extending in one direction. According to an embodiment, the plurality of wires (6211, 6212, . . . 621*n*, 6221, 6222, . . . 622*n*) may include a conductive material having high conductivity. The plurality of wires (6211, 6212, . . . 621*n*, 6221, 6222, . . . 622*n*) may include a material having higher conductivity than indium tin oxide (ITO) utilized as a transparent electrode. For example, the plurality of wires (6211, 6212, . . . 621*n*, 6221, 6222, . . . 622*n*) may include a material formed of copper, gold, silver, or a combination thereof.

According to an embodiment, a first wire set 621 may include a plurality of first wires (6211, 6212, . . . 621*n*) disposed parallel to each other. A second wire set 622 may include a plurality of second wires (6221, 6222, . . . 622*n*) disposed parallel to each other. The first wires (6211, 6212, . . . 621*n*) may be arranged to cross the second wires (6221, 6222, . . . 622*n*). For example, the first direction d1 in which the first wires (6211, 6212, . . . 621*n*) extend may be a direction not parallel to the second direction d2 in which the second wires (6221, 6222, . . . 622*n*) are extended. The first conductive pattern 620 may have a mesh-shaped pattern by the first wire set 621 and the second wire set 622.

According to an embodiment, the first wires (6211, 6212, 621*n*) and the second wires (6221, 6222, 622*n*) may cross each other to operate as an antenna structure disposed on the transparent substrate 610. The first conductive pattern 620 having the first wires (6211, 6212, 621*n*) and the second wires (6221, 6222, 622*n*) may operate as an antenna radiator via a feeding point 601 from a feeding part 602. For example, the wearable device may perform a communication with the outside via the feeding part 602 connected to the wireless communication circuit, in an area of the first conductive pattern 620 disposed between the ground patterns 629.

According to an embodiment, the second conductive pattern 630 may be electrically disconnected from the first conductive pattern 620. The second conductive pattern 630 may be a dummy pattern arranged around the first conductive pattern 620 operating as an antenna. A width of a gap g1 between the second conductive pattern 630 and the first conductive pattern may be reduced to reduce the visibility of the first conductive pattern 620 from the outside. The second conductive pattern 630 may have a pattern that is the same as or similar to the first conductive pattern 620.

According to an embodiment, the second conductive pattern 630 may be formed of a plurality of wires (6311, 6312, . . . 631*n*, 6321, 6322, . . . 632*n*). The second conductive pattern 630 may include a third wire set 631 including third wires (6311, 6312, . . . 631*n*) extending in the first direction d1 and parallel to each other, and a fourth wire set 632 including fourth wires (6321, 6322, . . . 632*n*) extending in the second direction d2 and parallel to each other.

According to an embodiment, an interval between a plurality of wires (6311, 6312, . . . 631*n*, 6321, 6322, . . . 632*n*) of the second conductive pattern 630 may be adjusted so that the first conductive pattern 620 and the second conductive pattern 630 are viewed as one pattern from the outside of the wearable device 200. For example, the interval between the third wires (6311, 6312, . . . 631*n*) of the third wire set 631 may be the same as the interval between the first wires (6211, 6212, . . . 621*n*) of the first wire set 621. The interval between the fourth wires (6321, 6322, . . . 632*n*) of the fourth wire set 632 may be the same as the interval between the second wires (6221, 6222, . . . 622*n*) of the second wire set 622. A material of a plurality of wires (6311, 6312, . . . 631*n*, 6321, 6322, . . . 632*n*) making up the second conductive pattern 630 may be the same as a material of a plurality of wires (6311, 6312, . . . 631*n*, 6321, 6322, . . . 632*n*) composing the first conductive pattern 620.

According to an embodiment, a ground pattern 629 may include a fifth conductive wire set 6291 and a sixth conductive wire set 6292. The ground pattern 629 may be disposed to be spaced apart from the first conductive pattern 620. The ground pattern 629 may operate as a ground of the antenna operating as the first conductive pattern 620.

According to an embodiment, the first conductive pattern 620 may be spaced apart from the ground pattern 629. For example, a region 628 in which a pattern is not printed may exist between the first conductive pattern 620 and the ground pattern 629. The region 628 may be disposed along an edge of the first conductive pattern 620 and the ground pattern 629. As such a non-printed region 628 is disposed along the edges of the first conductive pattern 620 and the ground pattern 629, the first conductive pattern 620, the second conductive pattern 630, and the ground pattern 629 may be spaced apart from each other.

According to an embodiment, the first conductive pattern 620 may operate as a monopole antenna, and the ground pattern 629 may operate as a ground of the monopole antenna. The first conductive pattern 620 and the ground pattern 629 may be arranged in a grid of conductive patterns. As another example, in order to secure the performance of the monopole antenna operated by the first conductive pattern 620 and the ground pattern 629, the first conductive pattern 620 in a partial area in which the first conductive pattern 620 is disposed may be replaced with a metal plate, or the ground pattern 629 in a partial area in which the ground pattern 629 is disposed may be replaced with a metal plate. As another example, the first conductive pattern 620 may be replaced with a metal plate in its entirety, or the ground pattern 629 may be replaced with a metal plate in its entirety.

Referring to FIG. 6B, the first conductive pattern 620 and the second conductive pattern 630 may be arranged on one surface 611 of the transparent substrate 610. Although the first conductive pattern 620 and the second conductive pattern 630 are only illustrated in FIG. 6B, the ground pattern 629 may also be arranged on one surface 611 on which the first conductive pattern 620 and the second conductive pattern 630 are disposed.

According to an embodiment, the first wires (6211, 6212, 621*n*) of the first wire set 621 of the first conductive pattern 620 may be spaced apart from each other. The first wires (6211, 6212, . . . 621*n*) may be spaced apart from each other at the same interval. The second conductive pattern 630 may surround the first conductive pattern 620. For example, referring FIG. 6B, illustrating a cross-section taken along line A-A' of FIG. 6A, the second conductive pattern 630, which is a dummy pattern, may be disposed on both sides of the first conductive pattern 620 configured as an antenna pattern. The second conductive pattern 630 may include wires (6311, 6312, 631*k*) disposed on one side of the first conductive pattern 620 among the third wires (6311, 6312, . . . 631*k*, 6311, . . . 631*n*), and include wires (6311, . . . 631*n*) disposed on the other side of the first conductive pattern 620. One side of the first conductive pattern 620 and the second conductive pattern 630 may be disposed with a certain gap g1. The other side of the first conductive pattern 620 and the second conductive pattern 630 may be disposed with another gap g1.

The antenna structure 600 according to the above-described embodiment may be configured as a monopole antenna, and the first conductive pattern 620, the second conductive pattern 630, and the ground pattern 629 may be disposed on one surface of the transparent substrate 610, using the first conductive pattern 620 as the antenna, so that the antenna may be disposed in the display 230 or the transparent member 320 rather than a space within the frame (e.g., the frame 210 of FIG. 2). The wearable device 200 may reduce a space for arrangement of the antenna, thereby reducing the size of the frame 210, or obtaining more space for mounting other electronic components within the frame 210. With this antenna structure 600, the wearable device 200 may be disposed on the display 230 or the transparent member 320 by the user, and therefore the impedance change by the user's body part may be reduced and the performance degradation of the antenna may be reduced.

Figure 7A:
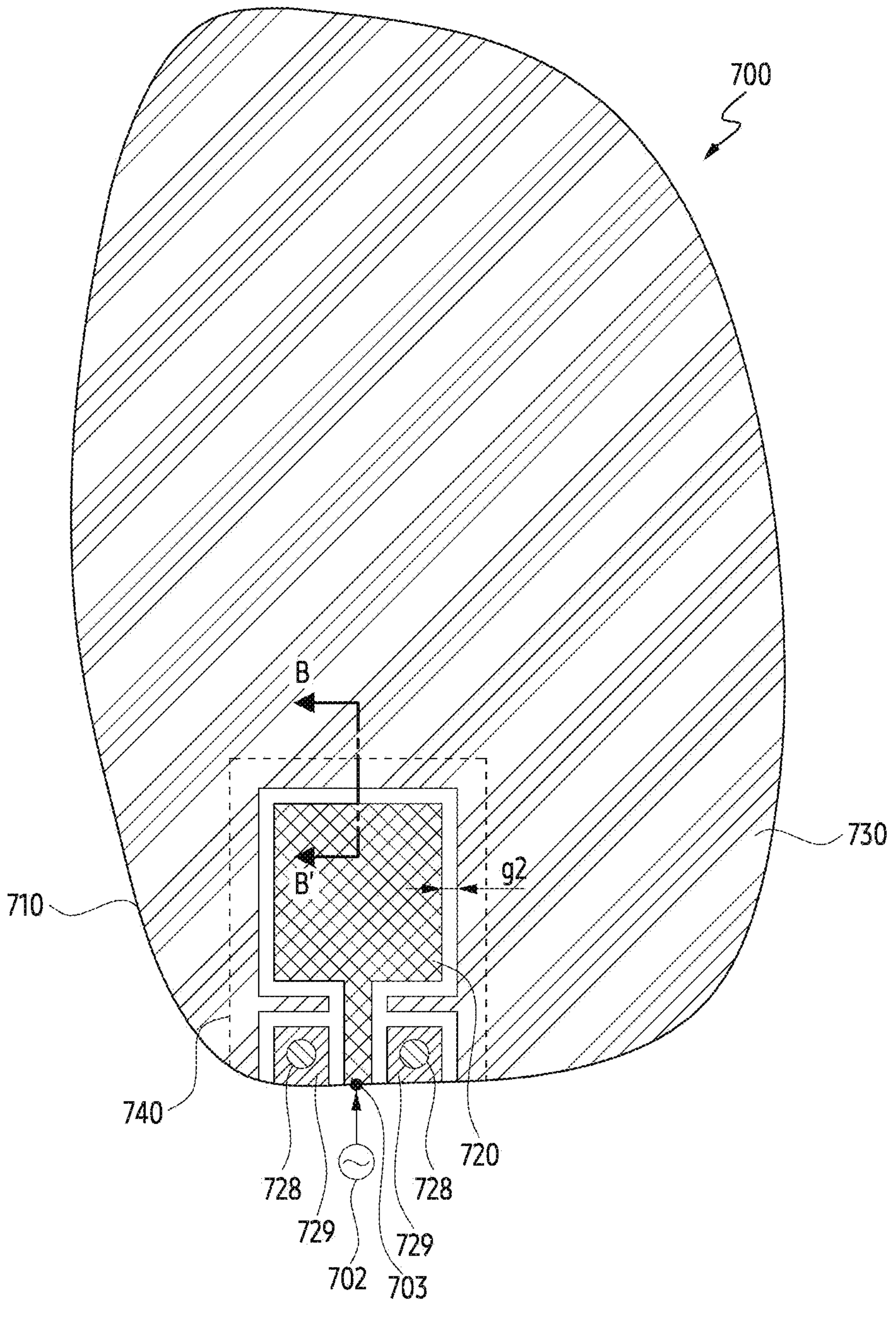
FIG. 7A illustrates an example of a patch antenna disposed on a transparent substrate according to an embodiment of the disclosure.

FIG. 7A illustrates an example of a patch antenna disposed on a transparent substrate according to an embodiment of the disclosure.

Figure 7B:
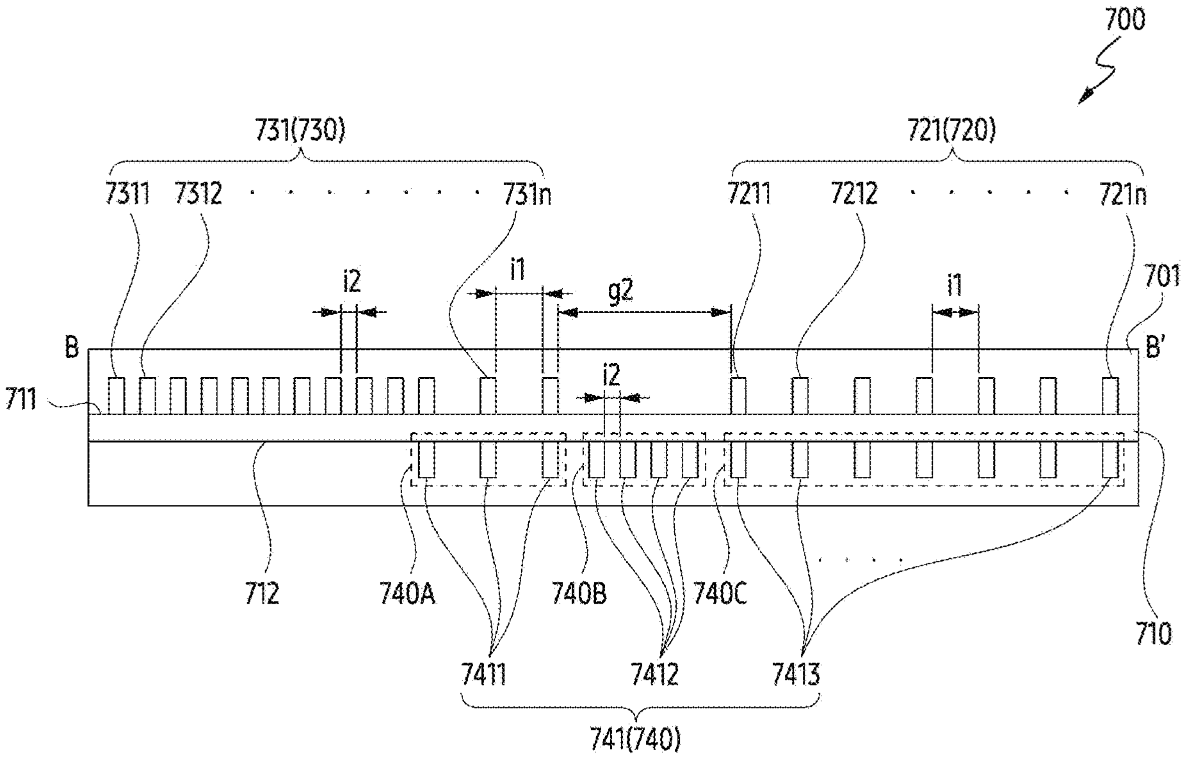
FIG. 7B is a cross-sectional view of the transparent substrate of FIG. 7A taken along line B-B' according to an embodiment of the disclosure.

FIG. 7B is a cross-sectional view taken along line B-B' of the transparent substrate of FIG. 7B according to an embodiment of the disclosure.

Referring to FIGS. 7A and 7B, the antenna structure 700 may include a transparent substrate 710, a first conductive pattern 720, a second conductive pattern 730, and a ground pattern 740. The antenna structure 700 may operate as a patch antenna using the first conductive pattern 720 and the ground pattern 740.

According to an embodiment, the first conductive pattern 720 and the second conductive pattern 730 may be disposed on one surface 711 of the transparent substrate 710. The ground pattern 740 may be disposed on the other surface 712 of the transparent substrate 710. The ground pattern 740 may be electrically connected to a connection pattern 729 disposed on the surface 711 through a via 728. When the transparent substrate 710 is viewed from above, the first conductive pattern 720 may overlap the ground pattern 740. The first conductive pattern 720 may operate as an antenna radiator from a feeding part 702 via a feeding point 703. In an area of the first conductive pattern 720 disposed between the ground patterns 740, the wearable device may communicate with the outside through the feeding part 702 connected to a wireless communication circuit. The first conductive pattern 720 is disposed between the ground patterns 740, and thus the first conductive pattern 720 and the ground pattern 740 may provide a CPW structure including a signal line passing between ground planes disposed on the same plane.

According to an embodiment, the second conductive pattern 730 may be spaced apart from the first conductive pattern 720 and the connection pattern 729. For example, the first conductive pattern 720 may be disposed to have a gap g2 with respect to the second conductive pattern 730. A portion of the second conductive pattern 730 may be disposed to overlap the transparent substrate 710 when viewed from above.

According to an embodiment, the first conductive pattern 720 may have the same conductive pattern (e.g., a plurality of wires arranged in a mesh form) as that of the first conductive pattern 620 of FIG. 6A. The second conductive pattern 730 may have a conductive pattern (e.g., a plurality of wires arranged in a mesh shape) similar to the second conductive pattern 630 of FIG. 6A. According to an embodiment, the connection pattern 729 and the ground pattern 740 may have the same or similar pattern as those of the first conductive pattern 720 and the second conductive pattern 730.

Referring to FIG. 7B, the first conductive pattern 720 may have a first wire set 721 (e.g., the first wire set 621 of FIG. 6A), and the second conductive pattern 730 may have a third wire set 731 (e.g., the third wire set 631 of FIG. 6A). The ground pattern 740 may have a ground wire set 741 (e.g., the fifth wire set 6291 of FIG. 6A or the sixth wire set 6292 of FIG. 6A). Like the ground pattern 629 of FIG. 6A, the ground wire set 741 may have a mesh-shaped pattern.

According to an embodiment, the ground pattern 740 may include a first region 740A overlapping the second conductive pattern 730, a second region 740B overlapping the gap g2 between the first conductive pattern 720 and the second conductive pattern 730, and a third region 740C overlapping the first conductive pattern 720.

The ground pattern 740 may include a first ground wire set 7411 disposed in the first region 740A, a second ground wire set 7412 disposed in the second region 740B, and a third ground wire set 7413 disposed in the third region 740C.

According to an embodiment, the interval distance between the first wires (7211, 7212, . . . 721*n*) of the first conductive pattern 720 may be i1. The interval between the second wires (7311, 7312, . . . 731*n*) of the second conductive pattern 730 may vary depending on the arrangement position. For example, the interval distance between wires of the second conductive pattern 730 disposed in an area overlapping the first region 740A of the ground pattern 740 may be i1. The interval between wires of the second conductive pattern 730 disposed in an area that does not overlap the ground pattern 740 may be i2. The first size may be larger than the second size. For example, the size of the openings between the fifth wire set 6291 and the sixth wire set 6292 in the first region 740A may be the same as the size of the openings between the third wire set 631 and the fourth wire set 632.

According to an embodiment, light may be reflected by the wire set 731 of the second conductive pattern 730 and the first wire set 7411 of the ground pattern 740 in an area overlapping the first region 740A of the ground pattern 740. The amount of light passing through the transparent member 701 may be reduced by the reflected light. The amount of light reflected by the wires of the second conductive pattern 730 disposed in an area of the second conductive pattern 730 that does not overlap the ground pattern 740 may be less than the amount of light reflected by the second conductive pattern 730 and the ground pattern 740 in an area overlapping the ground pattern 740. In order to compensate for the reduced amount of light passing through the transparent member 701, an interval distance i1 between wires of the second conductive pattern 730 disposed in the area overlapping the first region 740A of the ground pattern 740 may be greater than i2. The size of the openings formed by the fifth wires set 6291 and the sixth wire set 6292 disposed in the second region 740B may be less than the size of the openings formed by the fifth wire set 6291 and the sixth wire set 6292 disposed in the first region 740A.

According to an embodiment, the light incident onto the transparent member 701 in the second region 740B of the ground pattern 740 may be reflected by the wire set 7412 of the second ground pattern of the ground pattern 740. The amount of light reflected from the second region 740B may be less than the amount of light reflected from the first region 740A because only the wire set 7412 of the second ground pattern reflects the incident light. To compensate for the amount of reflected light, the interval distance i1 between the second ground pattern wire set 7412 of the ground pattern 740 disposed in the second region 740B may be greater than the interval distance i2 between the first ground pattern wire set 7411 of the ground pattern 740 disposed in the first region 740A.

According to an embodiment, the light incident on the transparent member 701 in the third region 740C of the ground pattern 740 may be reflected by the third ground pattern wire set 7413 of the ground pattern 740 and the first wire set 721 of the first conductive pattern 720. In order to compensate for the amount of reflected light, the third ground pattern wire set 7413 of the ground pattern 740 disposed in the third region 740C may be disposed at intervals of the interval distance i1. The first wires (7211, 7212, . . . 721*n*) of the first conductive pattern 720 disposed in the third region 740C may be disposed at intervals of the interval distance i1. For example, the size of the openings between the fifth wire set 6291 and the sixth wire set 6292 disposed in the third region 740C may be the same as the size of the openings between the first wire set 621 and the second wire set 622.

According to an embodiment, in an area where the conductive pattern disposed on one surface 711 of the transparent substrate 710 and the conductive pattern disposed on the other surface 712 thereof overlap each other, the conductive patterns may be arranged to widen the gap between the respective conductive patterns or to widen the spacing of the mesh formed by the conductive patterns. Due to the widened gap of the conductive patterns, the transparent member 701 may provide a structure capable of reducing a difference in the amount of light transmitted from the outside according to the arrangement of the conductive patterns.

Figure 8A:
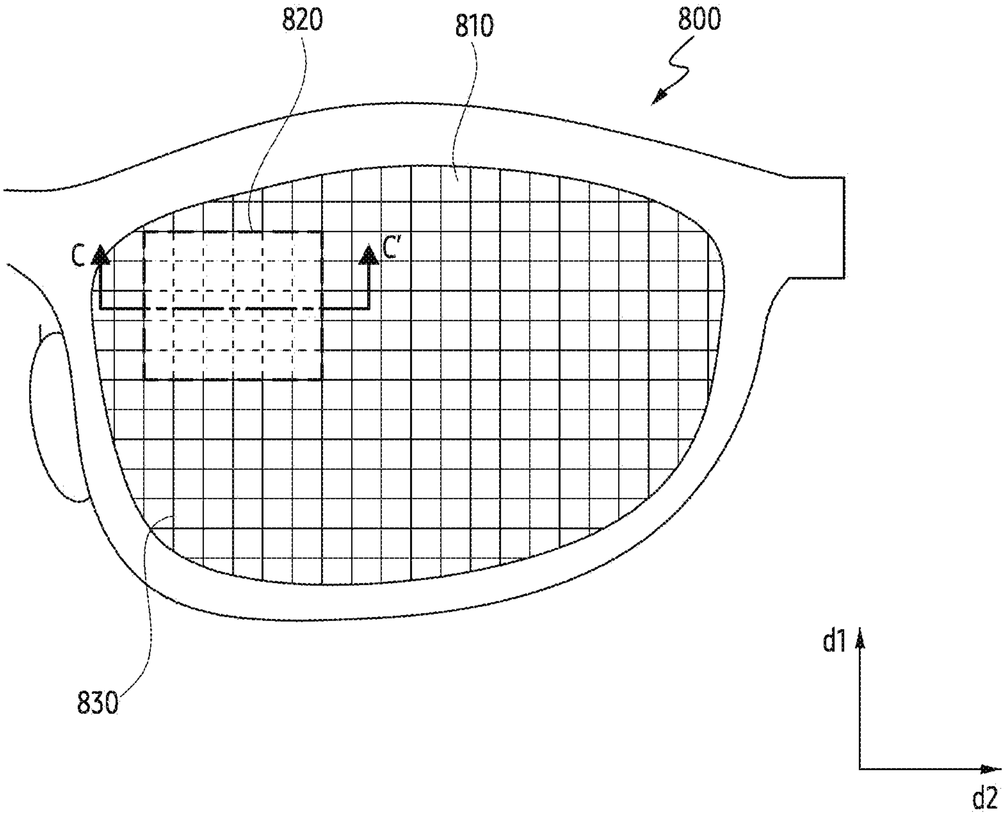
FIG. 8A illustrates an example of a structure in which a first conductive pattern is disposed on one surface of a transparent substrate and a second conductive pattern is disposed on another surface of the transparent substrate according to an embodiment of the disclosure.

FIG. 8A illustrates an example of a structure in which the first conductive pattern is disposed on one surface of the transparent substrate and the second conductive pattern is disposed on another surface of the transparent substrate according to an embodiment of the disclosure.

Figure 8B:
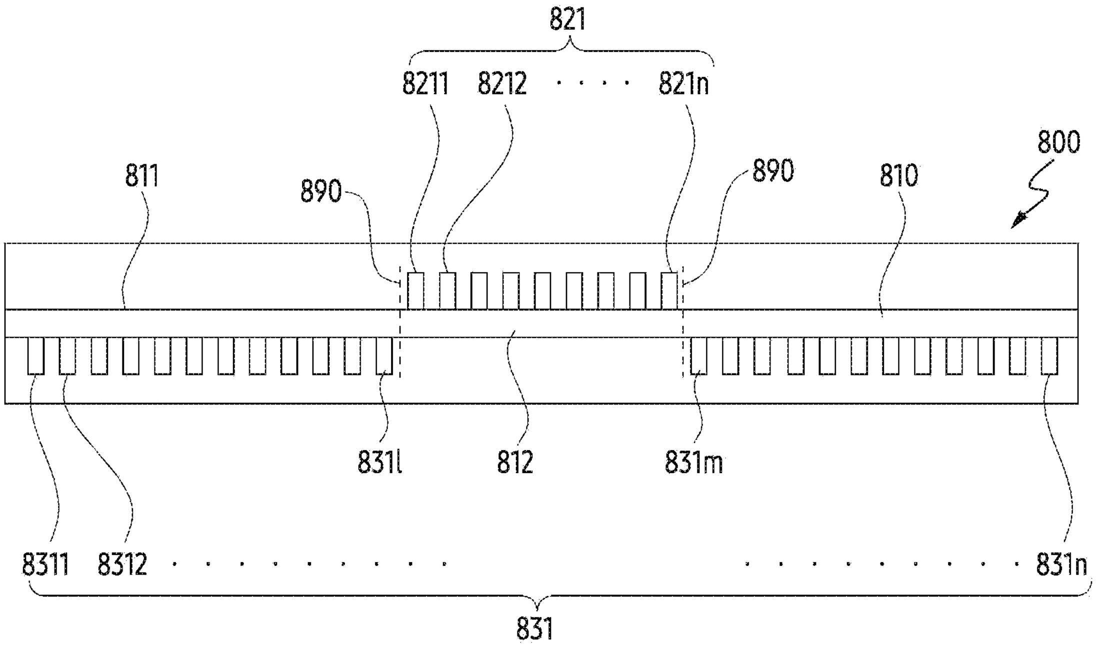
FIG. 8B is a cross-sectional view of the transparent substrate of FIG. 8A taken along line C-C' according to an embodiment of the disclosure.

FIG. 8B is a cross-sectional view taken along line C-C' of the transparent substrate of FIG. 8A according to an embodiment of the disclosure.

Referring to FIGS. 8A and 8B, an antenna structure 800 may include a transparent member 810, a first conductive pattern 820, and a second conductive pattern 830.

The first conductive pattern 820 may have the same or similar structure as the first conductive pattern 620 of FIG. 6A or the first conductive pattern 720 of FIG. 7A. The second conductive pattern 830 may have the same or similar structure as the second conductive pattern 630 of FIG. 6A or the second conductive pattern 730 of FIG. 7A. The second conductive pattern 830 may surround the first conductive pattern 820 when the transparent member 810 is viewed. The first conductive pattern 820 may be disposed on one surface 811 of the transparent member 810. The second conductive pattern 830 may be disposed on the other surface 812 of the transparent member 810 opposite to the one surface 811.

According to an embodiment, the first conductive pattern 820 may operate as a monopole antenna. The second conductive pattern 830 may be a dummy pattern for reducing external visibility of the first conductive pattern 820. The first conductive pattern 820 may include first wires (8211, 8212, . . . 821*n*) of a first wire set 821. The second conductive pattern 830 may include third wires (8311, 8312, . . . 831*k*, 831*m*, 831*n*) of a third wire set 831. The interval between the first wires (8211, 8212, . . . 821*n*) may be substantially the same as the interval between the third wires (8311, 8312, . . . 831*k*, 831*m*, 831*n*).

According to an embodiment, at a boundary 890 between the first conductive pattern 820 and the second conductive pattern 830, the first wire (8211, 821*n*) close to the boundary 890 among the first wires and the third wire (8311, 831*m*) close to the boundary 890 among the third wires (8311, 8312, . . . 831*k*, 831*m*, 831*n*) may be arranged at the same interval as the interval between the first wires (8211, 8212, . . . 821*n*) or the interval between the third wires (8311, 8312, . . . 831*k*, 831*m*, 831*n*).

The antenna structure 800 according to the above-described embodiment may be configured to dispose the first conductive pattern 820 operating as an antenna and the second conductive pattern 830 on both surfaces of the transparent member 810, respectively, thereby electrically disconnecting the first conductive pattern 820 and the second conductive pattern 830 from each other. When the transparent member 810 is viewed from above, the first conductive pattern 820 and the second conductive pattern 830 separated by the transparent member 810 may be visually recognized to have a mesh with a certain interval.

Figure 9A:
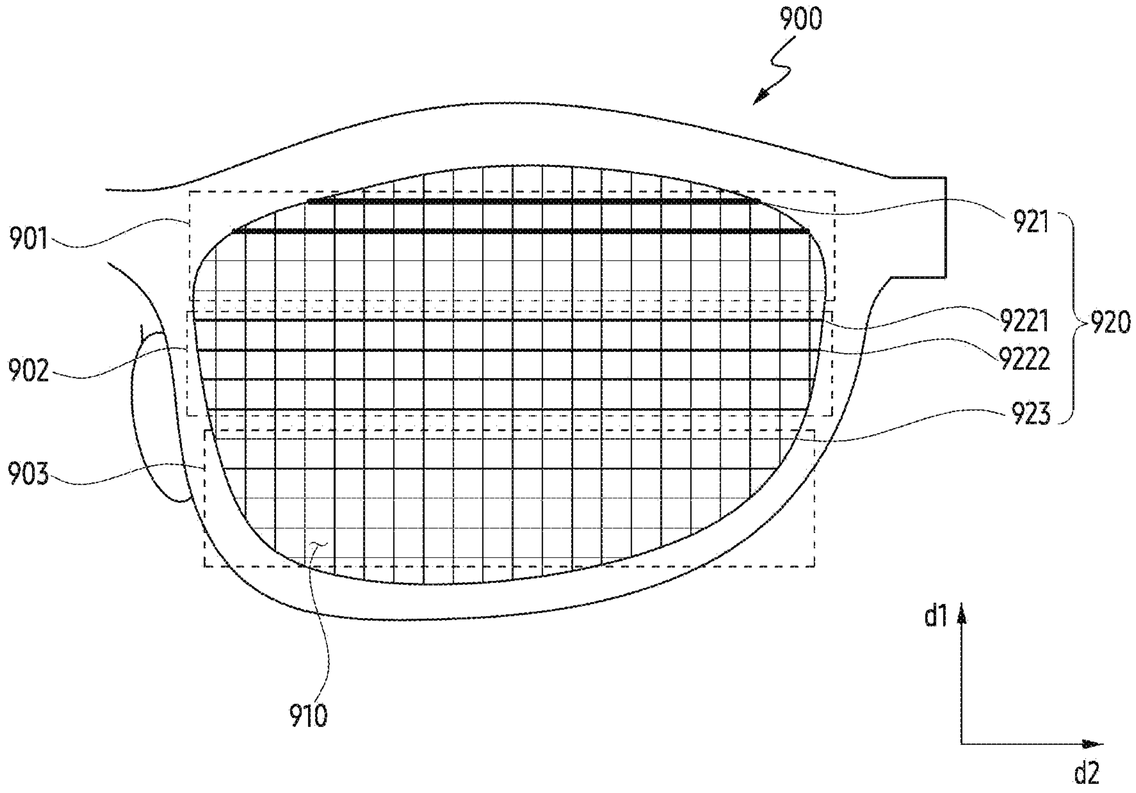
FIG. 9A illustrates an example of a structure in which wires having different thicknesses are disposed on a transparent member according to an embodiment of the disclosure.

FIG. 9A illustrates an example of a structure in which wires having different thicknesses are arranged on a transparent member according to an embodiment of the disclosure.

Figure 9B:
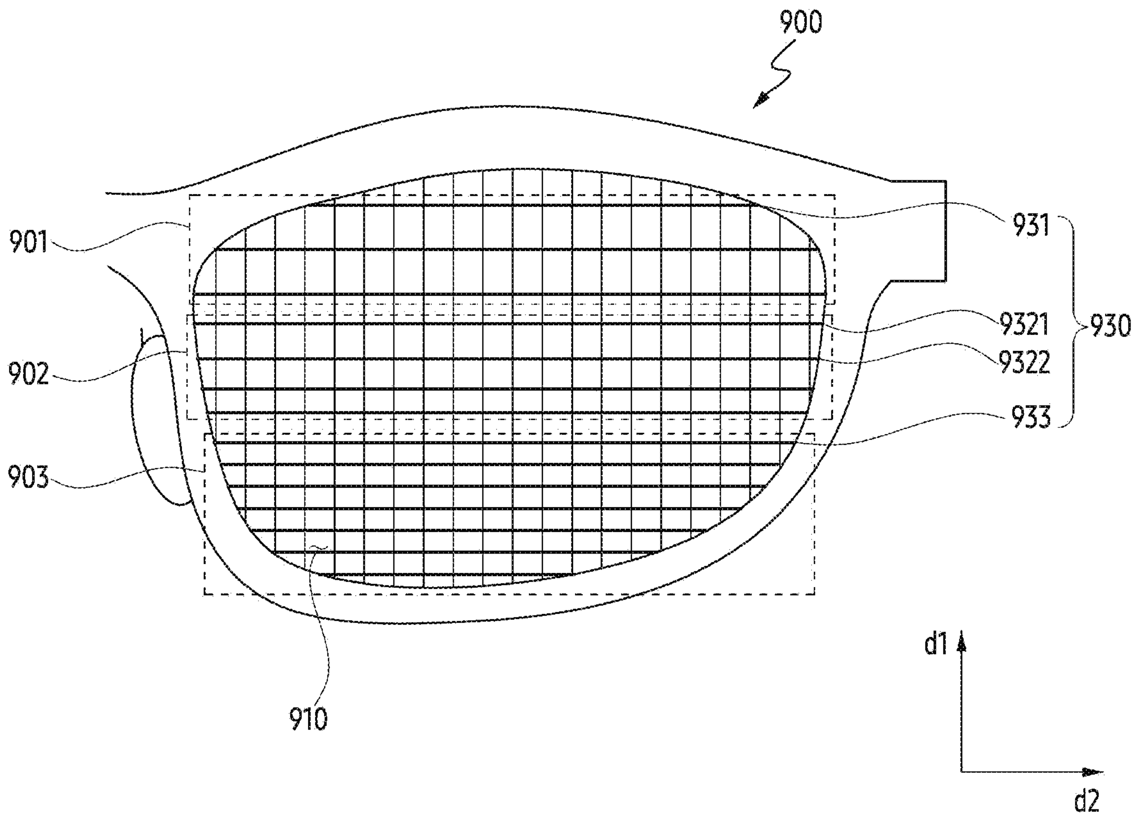
FIG. 9B illustrates an example of adjusting an interval between wires according to an embodiment of the disclosure.

FIG. 9B illustrates an example of adjusting an interval between the wires, according to an embodiment of the disclosure.

Referring to FIGS. 9A and 9B, when the wearable device 900 is viewed from the outside, the wearable device 900 may have a structure capable of providing a color that is visually recognized as gradually changing from a first portion 901 to a third portion 903. In the wearable device 900, the conductive wires 920 disposed on the transparent member 910 may have different thicknesses as shown in FIG. 9A, or may have different intervals as shown in the conductive wires 930 of FIG. 9B.

Referring to FIG. 9A, the thicknesses of the conductive wires (921, 9221, 9222, 923) disposed perpendicular to a first direction d1 among the conductive wires 920 disposed in the transparent member 910 may be increased along the first direction d1. According to an embodiment, the transparent member 910 may be divided into a first portion 901, a second portion 902, and a third portion 903. The conductive wires 921 disposed in the first portion 901 including the first conductive pattern (e.g., the first conductive pattern 620 of FIG. 6A, the first conductive pattern 720 of FIG. 7A, or the first conductive pattern 820 of FIG. 8A) of the antenna structure (e.g., the antenna structure 600 of FIG. 6A, the antenna structure 700 of FIG. 7A, or the antenna structure 800 of FIG. 8A) may have the same thickness. The thickness of the conductive wires 921 disposed in the first portion 901 may be the same as the thickness of the wires of the patterns forming the antenna.

The second portion 902 may be disposed closer to the first portion 901 than the third portion 903. For example, the second portion 902 may be disposed in between the first portion 901 and the third portion 903. The thicknesses of the wires (9221, 9222) disposed in the second portion 902 perpendicular to the first direction d1 may be gradually increased along the first direction d1. For example, the wire 9221 positioned close to the first portion 901 of the wires (9221, 9222) disposed in the second portion 902 may be thicker than the other wires 9222.

The thickness of the wires 923 disposed in the third portion 903 may be less than those of the wires 921 disposed in the first portion 901 and the wires (9221, 9222) disposed in the second portion 902. The wires 923 disposed in the third portion 903 may have the same thickness.

According to an embodiment, the thickness of the wires 921 perpendicular to the first direction d1 disposed in the first portion 901 may be also gradually increased along the first direction d1. The thickness of the wires 923 perpendicular to the first direction d1 disposed in the third portion 903 may be gradually increased along the first direction d1.

The wearable device 900 according to the above-described embodiment may provide different amounts of light passing through the first portion 901, the second portion 902, and the third portion 903. For example, the wearable device 900 may provide a structure in which the amounts of light passing through respective regions are different from each other, by varying the thicknesses of the wires (921, 9221, 9222, 923) perpendicular to the first direction d1 along the first direction d1. Therefore, when the wearable device 900 is viewed from the outside, it is possible to provide a sunglass structure having a transparent member or display having a gradation effect from the first portion 901 to the third portion 903.

Referring back to FIG. 9B, the interval distance between the conductive wires (931, 9321, 9322, 933) disposed perpendicular to the first direction d1 among the conductive wires 930 disposed in the transparent member 910 may be increased along the first direction d1. According to an embodiment, the interval distances between the conductive wires 921 disposed in the first portion 901 may be substantially the same as each other.

The distance between the wires (9221, 9222) disposed in the second portion 902 perpendicular to the first direction d1 may be gradually increased along the first direction d1. For example, among the wires (9321, 9322, 9323) disposed in the second portion 902, the distance between the first wire 9321, which is close to the first portion 901, and the second wire 9322 may be greater than the distance between the second wire 9322 and the third wire 9323, which positioned farther than the second wire 9322 from the first portion.

The distance between the wires 923 disposed in the third portion 903 may be closer than the distance between the wires 931 disposed in the first portion 901 and the distance between the wires 9321 and 9322 disposed in the second portion 902. The distances between the wires 933 disposed in the third portion 903 may be substantially the same as each other.

According to an embodiment, the distances between the wires 931 perpendicular to the first direction d1 disposed in the first portion 901 may also increase gradually along the first direction d1. The distances between the wires 933 perpendicular to the first direction d1 disposed in the third portion 903 may also increase gradually along the first direction d1.

Figure 10:
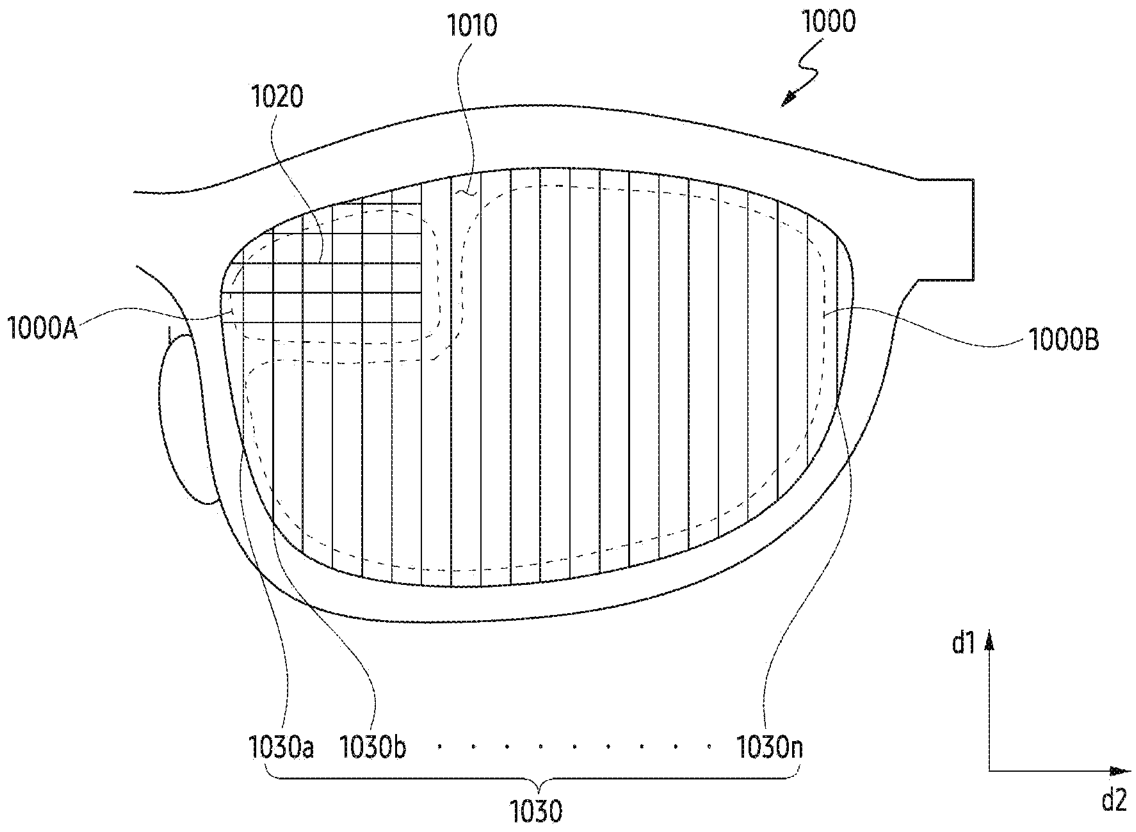
FIG. 10 illustrates an example of a structure in which a polarization function is implemented in a wearable device according to an embodiment of the disclosure.

FIG. 10 shows a structure in which a polarization function is implemented in a wearable device according to an embodiment of the disclosure.

Referring to FIG. 10, a wearable electronic device 1000 may include a transparent member 1010, a first conductive pattern 1020, and a second conductive pattern 1030.

The first conductive pattern 1020 may be a conductive pattern in which a plurality of wires are arranged to cross each other to form a mesh. The first conductive pattern 1020 may be the same conductive pattern as the first conductive pattern 620 of FIG. 6A, the first conductive pattern 720 of FIG. 7A, and the first conductive pattern 820 of FIG. 8A.

According to an embodiment, the second conductive pattern 1030 may include wires (1030*a*, 1030*b*, . . . 1030*n*) disposed along the first direction d1.

According to an embodiment, a first region 1000A in which the first conductive pattern 1020 is disposed to be implemented as an antenna may not provide a polarization effect of light incident from the outside due to conductive wires arranged in a mesh form, but a second region 1000B in which the second conductive pattern 1030 including the wires (1030*a*, 1030*b*, 1030*c*) extending in the first direction d1 is disposed may provide a polarization effect of light incident on the transparent member 1010 by the wires (1030*a*, 1030*b*, 1030*c*). The wires (1030*a*, 1030*b*, 1030*c*) extending in the first direction d1 may pass light having a wavelength of amplitude parallel to the first direction d1 of the light incident on the transparent member 1010 and then provide the light to the user.

According to an embodiment, the wires (1030*a*, 1030*b*, 1030*c*) of the second conductive pattern 1030 have been described as being arranged parallel to the first direction d1, but the wires of the second conductive pattern 1030 may extend along the second direction d2. The second conductive pattern 1030 including the wires extending in the second direction may pass light having a wavelength of amplitude parallel to the second direction d2 among the light incident on the transparent member 1010 to provide the light to the user.

Figure 11A:
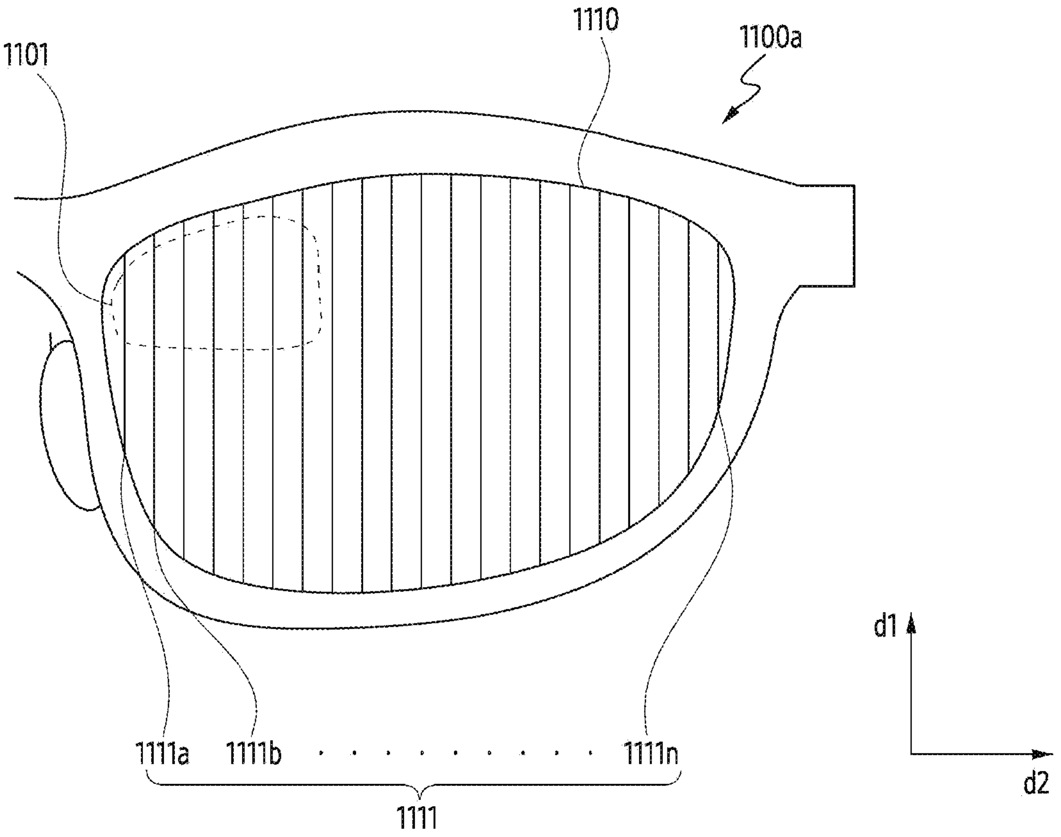
FIG. 11A illustrates an example of a structure in which a polarization function is implemented in an entire area of a transparent member of a wearable device according to an embodiment of the disclosure.

FIG. 11A illustrates an example of a structure in which a polarization function is implemented in an entire area of a transparent member of a wearable device, according to an embodiment of the disclosure.

Figure 11B:
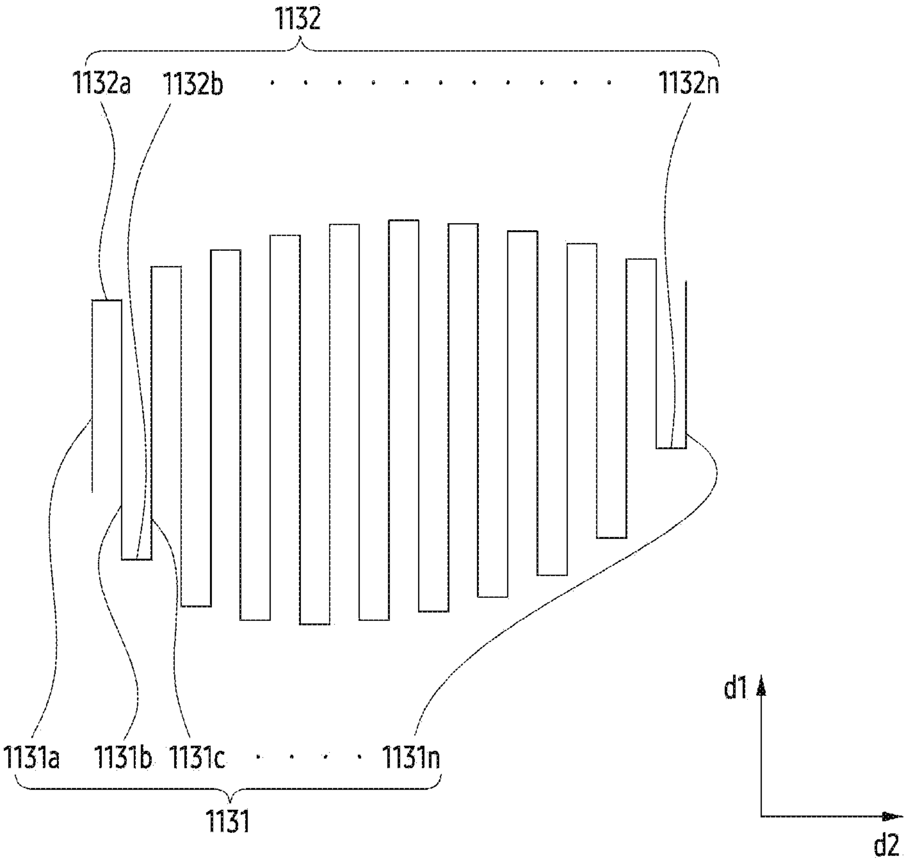
FIG. 11B illustrates an example of a modified structure in which a polarization function is implemented in an entire area of a transparent member of a wearable device according to an embodiment of the disclosure.

FIG. 11B illustrates an example of a modified structure in which a polarization function is implemented in an entire area of a transparent member of a wearable device, according to an embodiment of the disclosure.

Referring to FIG. 11A, a wearable device 1100*a* may include a transparent member 1110 and a conductive pattern 1111 extending in the transparent member 1110 in the first direction d1.

According to an embodiment, wires (1111*a*, 1111*b*, 1111*n*) making up the conductive pattern 1111 may extend along the first direction d1. At least one wire of the conductive pattern 1111 may be used as a monopole antenna.

According to an embodiment, the wearable device 1100*a* may be utilized as a lens having a polarization effect in the entire area of the transparent member. The wires (1111*a*, 1111*b*, . . . 1111*n*) extending in the first direction d1 may pass light having a wavelength of amplitude parallel to the first direction d1 among light incident on the transparent member 1010 and provide the light to the user.

According to an embodiment, the wearable device 1100*a* may utilize an antenna in the entire area of lens. For example, one wire 1111*a* of the wires (1111*a*, 1111*b*, . . . 1111*n*) of the conductive pattern 1111 may be used as an antenna in a first frequency band, and the other wire 1111*b* may be used as an antenna in a second frequency band. However, the disclosure is not limited thereto, and an antenna pattern may be disposed in the antenna area 1101, which is a partial area of the wearable device 1100*a*.

The wearable device 1100*a* according to an embodiment may provide a structure having the polarization characteristics in the entire area of the transparent member 1110.

Referring to FIG. 11B, an antenna pattern 1131 disposed in the antenna area 1101 may be separately disposed. The antenna pattern 1131 may be formed of one pattern or one wire. For example, the antenna pattern 1131 may include extension wires (1131*a*, 1131*b*, 1131*c*, . . . 1131*n*) extending in the first direction d1, and may include connection wires (1132*a*, 1132*b*, . . . 1132*n*) extending in the second direction d1 to connect adjacent extension wires of the extension wires (1131*a*, 1131*b*, 1131*c*, . . . 1131*n*) to each other. The extension wires (1131*a*, 1131*b*, 1131*c*, . . . 1131*n*) may be connected to each other by the connection wires (1132*a*, 1132*b*, . . . 1132*n*) to form a single pattern. For example, the first connection wire 1132*a* may connect one end of the first extension wires 1131*a* facing the first direction d1 to one end of the second extension wire 1131*a* facing the first direction d1, among the extension wires (1131*a*, 1131*b*, 1131*c*, . . . 1131*n*). The second connection wire 1132*b* may connect the other end of the second extension wire 1131*b* facing the second direction d1 and one end of the third extension wire 1131*c* facing the second direction d1.

The antenna pattern 1131 according to an embodiment may be formed in a pattern similar to the conductive pattern 1111 and may provide a structure of the transparent member 1110 having the polarization characteristics.

Figure 12:
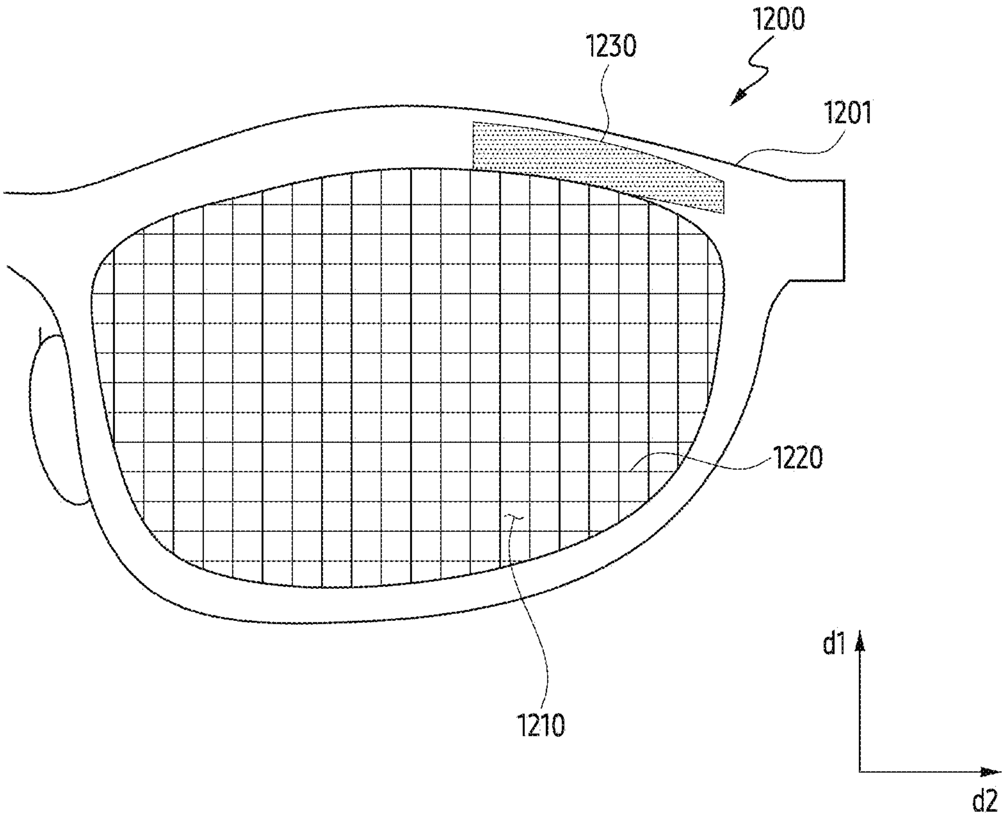
FIG. 12 illustrates an example in which a heating member is added to a wearable device according to an embodiment of the disclosure.

FIG. 12 illustrates an example in which a heating member is added to a wearable device according to an embodiment of the disclosure.

Referring to FIG. 12, the wearable device 1200 may include a transparent member 1210 and a conductive pattern 1220. The conductive pattern 1220 disposed in the transparent member 1210 may include different conductive patterns separated from each other. The conductive pattern 1220 may include an antenna pattern and a dummy pattern distinguished from the antenna pattern. For example, the conductive pattern 1220 may include the first conductive pattern 620, the second conductive pattern 630, and the ground pattern 629 of FIG. 6A. As another example, the conductive pattern 1220 may include the first conductive pattern 720, the second conductive pattern 730, and the ground pattern 740 of FIG. 7A.

The wearable device 1200 may further include a heating member 1230 capable of transferring heat to the conductive pattern 1220. The heating member 1230 may be disposed in a frame 1201. The heating member 1230 may be connected to the conductive pattern 1220 to transfer heat to the conductive pattern 1220. The heating member 1230 may vaporize moisture present on a surface of the transparent member 1210 by transferring heat to the transparent member 1210 through the conductive pattern 1220. The heating member 1230 may vaporize moisture present on the surface of the transparent member 1210, thereby securing a field of view covered by moisture.

Figure 13:
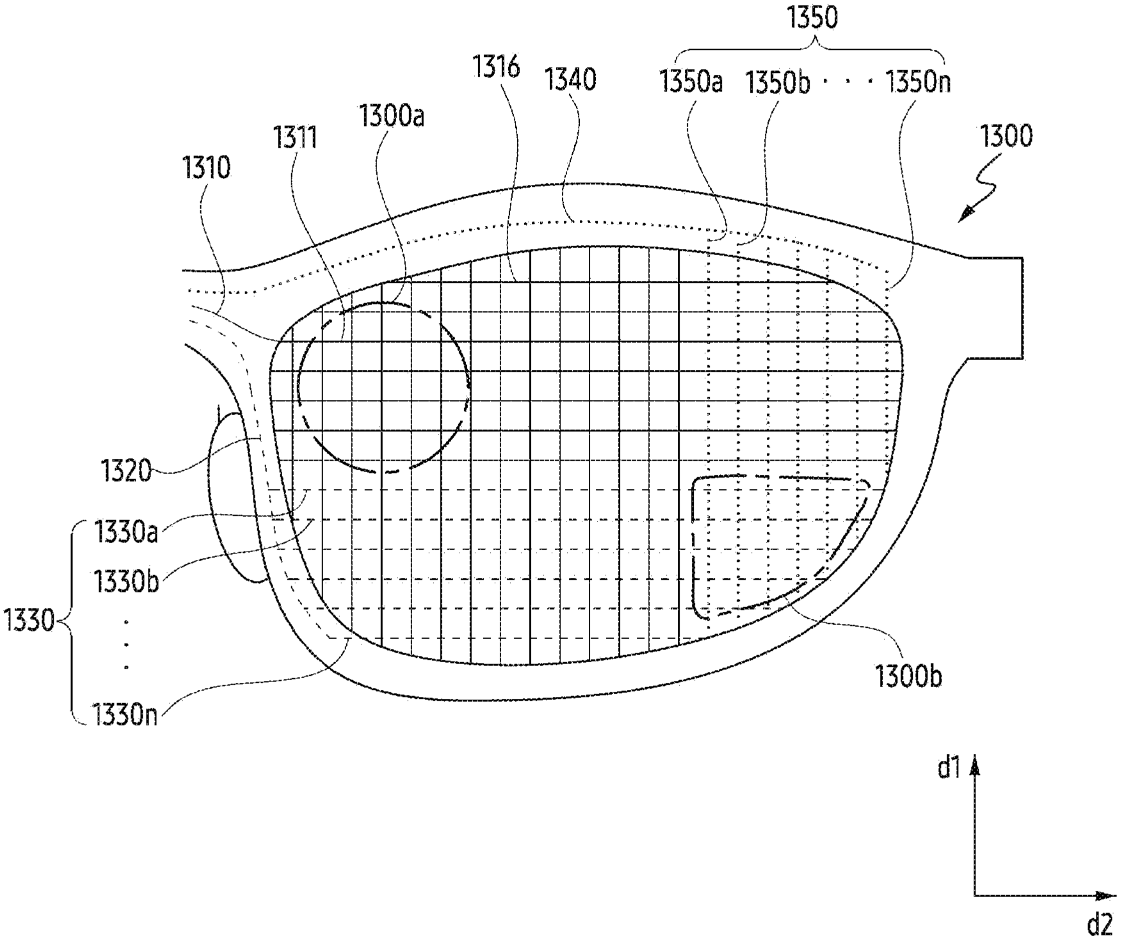
FIG. 13 illustrates an example in which a touch pattern is added to a wearable device according to an embodiment of the disclosure.

FIG. 13 illustrates an example in which a touch pattern is added to a wearable device according to an embodiment of the disclosure.

Referring to FIG. 13, the wearable device 1300 may include a first conductive pattern 1311 and a second conductive pattern 1316. The first conductive pattern 1311 may be disposed in an antenna area 1300*a*. The second conductive pattern 1316 may be disposed in an area other than the antenna area 1300*a*.

According to an embodiment, the first conductive pattern 1311 may be connected to a first line 1310 and may be electrically connected to a printed circuit board (e.g., the printed circuit board 510 of FIG. 5A).

According to an embodiment, the wearable device 1300 may provide a structure capable of utilizing a portion of the second conductive pattern 1316 as a touch pattern. The second conductive pattern 1316 may include first touch patterns 1330 extending in the first direction d1 and second touch patterns 1350 extending in the second direction d2. The first touch pattern 1330 and the second touch pattern 1350 may make up a touch circuit.

The wearable device 1300 may include a first touch pattern 1330 including wires (1330*a*, 1330*b*, . . . 1330*n*) extending in the second direction d2 among the wires of the second conductive pattern 1316, and a second touch pattern 1350 including wires (1350*a*, 1350*b*, . . . 1350*n*) extending in the first direction d1 among the wires of the second conductive pattern 1316. One of the first touch pattern 1330 and the second touch pattern 1350 may be utilized as a transmission pattern, and the other one may be utilized as a reception pattern. For example, the first touch pattern 1330 may be connected to the touch transmission line 1320 to be used as a transmission electrode. The second touch pattern 1350 may be connected to the touch reception line 1340 to be used as a reception electrode. The first touch pattern 1330 and the second touch pattern 1350 may include different electrodes.

An external input may be detected in a touch area 1300*b* where the first touch pattern wires (1330*a*, 1330*b*, . . . 1330*n*) making up the first touch pattern 1330 intersect the second touch pattern wires (1350*a*, 1350*b*, . . . 1350*n*) making up the second touch pattern 1350. Based on a change in capacitance between the first touch pattern 1330 and the second touch pattern 1350, an approach of the user's body part (e.g., finger) in the touch area 1300*b* may be detected. For example, the processor (e.g., the processor 120 of FIG. 1) may identify a user input, based on a change in the capacitance or capacitance data in an area where the first touch pattern 1330 and the second touch pattern 1350 intersect.

According to an embodiment, the touch area 1300*b* may be disposed at a location that is less susceptible to external signals. Since there is no ground around the touch area 1300*b*, there may be little signal interference, so that it may be easy to detect not only a touch input but also a hovering input.

According to an embodiment, the antenna area 1300*a* and the touch area 1300*b* may be distinguished from each other. For example, an area other than the antenna area 1300*a* may be used as the touch area 1300*b*.

Figure 14:
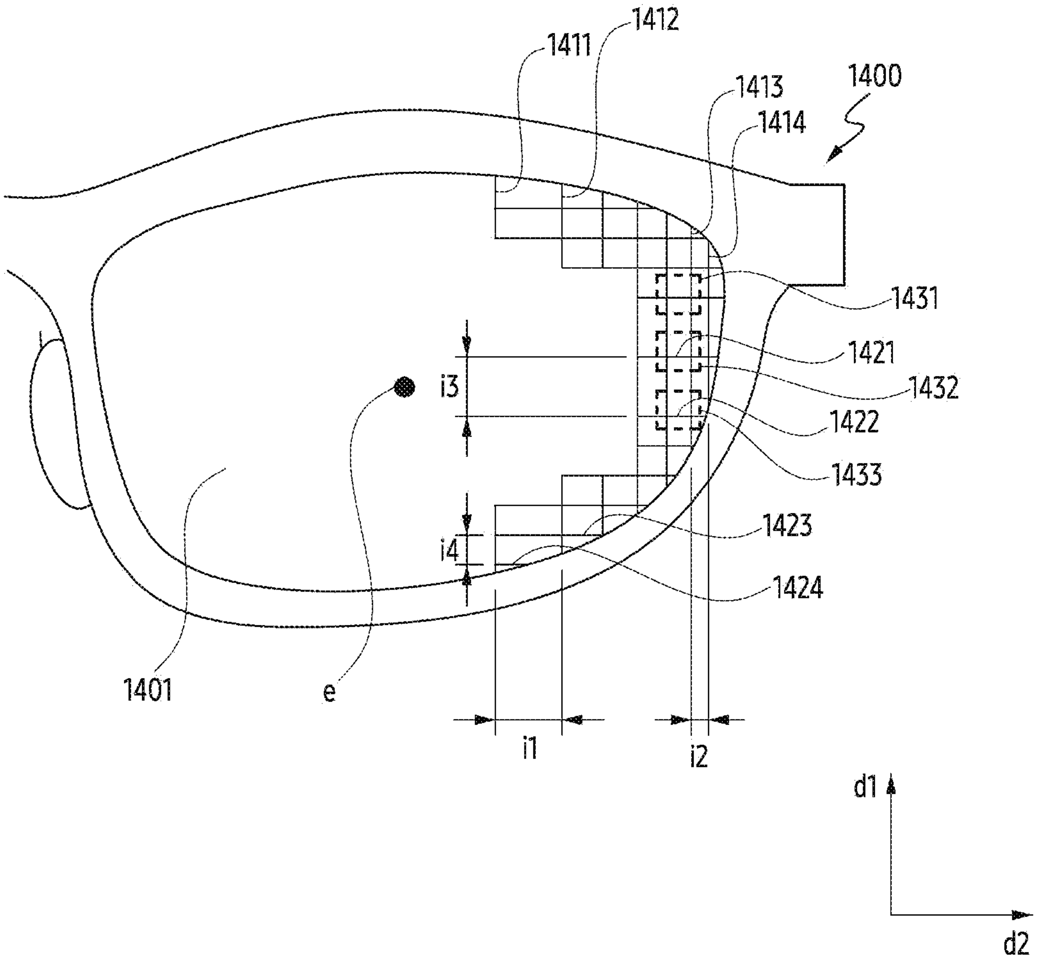
FIG. 14 illustrates an example in which a conductive pattern is disposed only in a portion of a transparent member of a wearable device according to an embodiment of the disclosure.

FIG. 14 illustrates an example in which a conductive pattern is disposed only in a portion of a transparent member of a wearable device according to an embodiment of the disclosure.

Referring to FIG. 14, a portion of a transparent member 1401 disposed in a wearable device 1400 may include first conductive wires (1411, 1412, 1413, 1414) and second conductive wires (1421, 1422, 1423, 1424).

According to an embodiment, a specified area e of the transparent member 1401 may be an area in which the user's eyes or pupils are positioned when the wearable device 1400 is worn. The wearable device 1400 may be not provided with any conductive wires in the specified area e, but may be provided with a conductive pattern formed by the conductive wires in at least a portion of the area other than the specified area e.

According to an embodiment, a distance between the first conductive wires (1411, 1412, 1413, 1414) horizontally disposed in the first direction d1 among the conductive wires disposed in the transparent member 1401 may be spaced apart along a first direction d2 or a direction opposite to the first direction d1 with respect to a designated point e. For example, the distance i1 between the two wires (1411, 1412) close to the designated point e among the first conductive wires may be greater than the distance i2 between the two wires (1413, 1414) located farther from the designated point e among the first conductive wires.

A distance between the second conductive wires (1421, 1422, 1423, 1424) disposed in the second direction d2 perpendicular to the first direction d1 among the conductive wires disposed in the transparent member 1401 may be spaced apart along the second direction d2 or the direction opposite to the second direction d2 with respect to the designated point e. For example, a distance i3 between the two wires (1421, 1422) close to the designated point e among the second conductive wires may be greater than a distance i4 between the two wires (1423, 1424) located farther from the designated point e among the first conductive wires.

According to an embodiment, the conductive pattern formed by the conductive wires (1411, 1412, 1413, 1414, 1421, 1422, 1423, 1424) may be disposed along a periphery of the transparent member 1401. For example, the conductive pattern formed by the conductive wires (1411, 1412, 1413, 1414, 1421, 1422, 1423, 1424) disposed on the transparent member 1401 may not be disposed within a specified distance from the designated point e of the transparent member 1401.

According to an embodiment, a mesh of the pattern formed by the conductive wires (e.g., the conductive wires 1413, 1414, 1423, 1424) arranged farther from the designated point e may be formed to be narrower than a mesh of the pattern formed by the remaining conductive wires (e.g., the conductive wires 1411, 1412, 1421, 1422).

According to an embodiment, in order to implement an antenna in an mmWave band (e.g., 28 GHz, 39 GHz, or 60 GHz), a pattern for implementing antenna radiators (1431, 1432, 1433) may be formed in an area having a small size of mesh. The antenna radiators (1431, 1432, 1433) may be implemented as a monopole antenna like the first conductive pattern 620 of FIG. 6A and the ground pattern 629 of FIG. 6A. The antenna radiators (1431, 1432, 1433) may be implemented as a patch antenna like the first conductive pattern 720 of FIG. 7A and the ground pattern 740 of FIG. 7A.

The wearable device 1400 according to the above-described embodiments may secure the user's field of view by disposing no conductive pattern in the specified area e in which the user's eyes or pupils are located on the transparent member 1401. The wearable device 1400 may provide a small-sized antenna radiator capable of implementing the antenna radiator in an ultra-high frequency band such as mmWave, by using the pattern composed of conductive wires of which width becomes narrower toward the side of the transparent member 1401.

According to the above-described embodiments, a wearable device (e.g., the wearable device 200 of FIG. 2) comprises: while the wearable device is worn by a user, a transparent member (e.g., the transparent member 320 of FIG. 3) configured to transmit, to the user, external light passing through a first side (e.g., the first side 231 of FIG. 3) and a second side (e.g., the second side 232 of FIG. 3) opposite to the first side; a transparent substrate (e.g., the transparent substrate 310 of FIG. 3), in the transparent member, disposed between the first side and the second side; a first conductive pattern (e.g., the first conductive pattern 250 of FIG. 2) disposed on a side of the transparent substrate facing the first side; a second conductive pattern (e.g., the second conductive pattern 260 of FIG. 2) disposed on another side of the transparent substrate facing the second side of the transparent member and electrically disconnected from the first conductive pattern; and at least one processor (e.g., the processor 120 of FIG. 1) electrically connected to the first conductive pattern and configured to communicate with an external electronic device through the first conductive pattern.

In the wearable device according to an embodiment, the first conductive pattern includes first wires (e.g., the first wires (6211, 6212, . . . 612$n$) of FIG. 6A), extending in a first direction (e.g., the first direction d1 of FIG. 1), parallel to each other and second wires (e.g., the second wires (6221, 6222, . . . 622$n$) of FIG. 6A), extending in a second direction different from the first direction, parallel to each other, and the first conductive pattern may be surrounded by the second conductive pattern, when the transparent substrate is viewed.

According to an embodiment, the second conductive pattern may include third wires (e.g., the third wires (6311, 6312, . . . 631$n$) of FIG. 6A) extending in the first direction and parallel to each other, and fourth wires (e.g., the fourth wires (6321, 6322, . . . 632$n$) of FIG. 6A) extending in the second direction and parallel to each other.

According to an embodiment, a thickness of each of the third wires may gradually decrease along the second direction.

According to an embodiment, the wearable device may further comprise a ground pattern (e.g., the ground pattern 740 of FIG. 7A) electrically disconnected from the second conductive pattern.

According to an embodiment, the ground pattern may be spaced apart from the first conductive pattern on one surface of the transparent substrate.

According to an embodiment, the ground pattern may be spaced apart from the second conductive pattern on another surface of the transparent substrate, and may be electrically connected to the first conductive pattern by a via (e.g., the via 728 of FIG. 7A) conductive material penetrating the transparent substrate.

According to an embodiment, when the transparent substrate is viewed, the ground pattern may comprise a first region overlapping the first pattern, a second region overlapping a portion of a dummy pattern (e.g., the second conductive pattern 730 of FIG. 7A), and a third region between the first region and the second region.

According to an embodiment, an interval between the fifth wires disposed in the first region may be substantially the same as an interval between the first wires.

According to an embodiment, an interval between the fifth wires disposed in the second region may be substantially the same as an interval between the third wires.

According to an embodiment, an interval between the fifth wires disposed in the third region may be less than an interval between the first wires.

According to an embodiment, when the transparent substrate is viewed, the first conductive pattern and the second conductive pattern may have a continuous pattern.

According to an embodiment, the second conductive pattern may include third wires extending in the first direction and parallel to each other.

According to an embodiment, the third wires may be configured to filter some of light incident on the transparent member.

According to an embodiment, the wearable device may further include a printed circuit board (e.g., the printed circuit board 510 of FIG. 5A) electrically connected to the at least one processor.

According to an embodiment, the wearable device may further include a feeding substrate (e.g., the flexible printed circuit board 313 of FIG. 5A) extending from the transparent substrate and connected to the printed circuit board.

According to an embodiment, the wearable device may further include touch circuitry configured to identify a user input, based on capacitance data changed by an external object obtained through the second conductive pattern.

According to an embodiment, the second conductive pattern may include transmission lines (e.g., the first touch pattern 1330 of FIG. 13) extending in the first direction and reception lines (e.g., the second touch pattern 1350 of FIG. 13) extending in the second direction.

According to an embodiment, the touch circuitry may be configured to identify a user input, based on a change in the capacitance data in an area where the transmission lines and the reception lines intersect.

According to an embodiment, the area where the transmission lines and the reception lines intersect may be spaced apart from an area where the first conductive pattern is disposed.

According to an embodiment, the wearable device may further include a heating member configured to supply heat to the first conductive pattern or the second conductive pattern.

According to an embodiment, a wearable device (e.g., the wearable device 200 of FIG. 2) may comprise: at least one transparent display (e.g., the display 230 of FIG. 2), while the wearable device is worn by a user, configured to transmit external light facing a first side (e.g., the first side 231 of FIG. 3) to pass through a second side (e.g., the second side 232 of FIG. 3) opposite to the first side, and configured to display information on the second side; a transparent substrate (e.g., the transparent substrate 310 of FIG. 3) disposed in the at least one transparent display; a first conductive pattern (e.g., the first conductive pattern 250 of FIG. 2) disposed on a third side of the transparent substrate in a portion of a first region of the transparent substrate; a second conductive pattern (e.g., the second conductive pattern 260 of FIG. 2) disposed on a fourth side opposite to the third side in a remaining portion of the first region and a second region of the transparent substrate; and at least one processor (e.g., the processor 120 of FIG. 1) configured to be electrically connected to the first conductive pattern and configured to communicate with an external electronic device, through the first conductive pattern.

According to an embodiment, a thickness of the first conductive pattern and the second conductive pattern disposed on the first region may be greater than a thickness of the second conductive pattern disposed on the second region.

According to an embodiment, the first conductive pattern and the second conductive pattern may have a continuous pattern, when the transparent substrate is viewed.

According to an embodiment, the first conductive pattern may include first wires extending in a first direction and parallel to each other.

According to an embodiment, the second conductive pattern may include second wires extending in the first direction and parallel to each other.

According to an embodiment, a distance between the second wires disposed on the first region is greater than a distance between the second wires disposed on the second region.

According to an embodiment, the wearable device may further comprise a printed circuit board (e.g., the printed circuit board 510 of FIG. 5A) electrically connected to the at least one processor.

According to an embodiment, the wearable device may further comprise a feeding substrate connected to the printed circuit board and extending from the transparent substrate.

According to an embodiment, the wearable device may further comprise a ground pattern (e.g., the ground pattern 629 of FIG. 6A) disposed on the ground pattern, the ground pattern electrically disconnected from the second conductive pattern.

According to an embodiment, the antenna radiator may be disposed in a portion of the transparent substrate at least a specified distance away from a portion of the transparent substrate positioned over a pupil of the user when the wearable device is worn.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic", "logic block", "unit", "part", "portion", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:

a transparent member including a first side and a second side opposite to the first side;

a transparent substrate, in the transparent member, disposed between the first side and the second side;

a first conductive pattern disposed on a side of the transparent substrate facing the first side of the transparent member, wherein the first conductive pattern configured to function as an antenna radiator;

a second conductive pattern disposed on another side of the transparent substrate facing the second side of the transparent member and electrically disconnected from the first conductive pattern; and wireless communication circuitry electrically connected to the first conductive pattern and configured to provide a feed signal to the first conductive pattern.

2. The wearable device of claim 1, wherein the feed signal provided from the wireless communication circuitry to the first conductive portion is blocked from transferring to the second conductive portion.

3. The wearable device of claim 1, wherein the second conductive pattern includes third wires extending in the first direction and parallel to each other, and wherein the third wires filter a portion of light incident on the transparent member.

4. The wearable device of claim 1, further comprising:

a printed circuit board electrically connected to the wireless communication circuitry; and a feeding substrate connected to the printed circuit board and extending from the transparent substrate.

5. The wearable device of claim 1, further comprising:

touch circuitry configured to identify an input of a user based on based on capacitance data changed by an external object, the capacitance data obtained through the second conductive pattern.

6. The wearable device of claim 5, wherein the second conductive pattern includes a first touch pattern extending in the first direction and a second touch pattern extending in the second direction, and wherein the touch circuitry is configured to identity the input of the user, based on capacitance data changed in an area where the first touch pattern and the second touch pattern intersect.

7. The wearable device of claim 6, wherein the area where the first touch pattern and the second touch pattern intersect is spaced apart from an area where the first conductive pattern is disposed.

8. The wearable device of claim 1, further comprising:

a heating member supplying heat to the first conductive pattern or the second conductive pattern.

9. A wearable device comprising:

at least one transparent display including a first side and a second side opposite to the first side;

a transparent substrate disposed in the at least one transparent display;

a first conductive pattern disposed on a third side of the transparent substrate in a portion of a first region of the transparent substrate;

a second conductive pattern disposed on a fourth side opposite to the third side in a remaining portion of the first region and a second region of the transparent substrate; and at least one processor configured to be electrically connected to the first conductive pattern and configured to communicate with an external electronic device, through the first conductive pattern.

10. The wearable device of claim 9, wherein the first conductive pattern and the second conductive pattern have a continuous pattern, when the transparent substrate is viewed.

11. The wearable device of claim 10, wherein a thickness of the first conductive pattern and the second conductive pattern disposed on the first region is greater than a thickness of the second conductive pattern disposed on the second region.

12. The wearable device of claim 9, wherein the first conductive pattern includes first wires extending in a first direction and parallel to each other, and wherein the second conductive pattern includes second wires extending in the first direction and parallel to each other.

13. The wearable device of claim 12, wherein a distance between the second wires disposed on the first region is greater than a distance between the second wires disposed on the second region.

14. The wearable device of claim 1, wherein the first conductive pattern includes first wires, extending in a first direction, parallel to each other and second wires, extending in a second direction different from the first direction, parallel to each other, the first conductive pattern surrounded by the second conductive pattern, when the transparent substrate is viewed.

15. The wearable device of claim 14, wherein the second conductive pattern includes third wires, extending in the first direction, parallel to each other and fourth wires, extending in the second direction, parallel to each other.

16. The wearable device of claim 15, wherein a thickness of each of the third wires gradually decreases along the second direction.

17. The wearable device of claim 15, further comprising a ground pattern including:

fifth wires, extending in the first direction, parallel to each other, and electrically disconnected from the second conductive pattern; and sixth wires extending in the second direction and parallel to each other.

18. The wearable device of claim 17, wherein the ground pattern is spaced apart from the first conductive pattern on one surface of the transparent substrate.

19. The wearable device of claim 17, wherein the ground pattern is spaced apart from the second conductive pattern on another surface of the transparent substrate, and electrically connected to the first conductive pattern by a conductive material penetrating the transparent substrate, and wherein, when the transparent substrate is viewed, the ground pattern includes:

a first region overlapping the first conductive pattern, a second region overlapping a portion of the second conductive pattern, and a third region between the first region and the second region.

20. The wearable device of claim 19, wherein a size of first openings, between the fifth wires and the sixth wires, disposed on the first region is equal to a size of second openings between the first wires and the second wires, wherein a size of second openings, between the fifth wires and the sixth wires, disposed on the second region is equal to a size of fourth openings between the third wires and the fourth wires, and wherein a size of fifth openings, between the fifth wires and the sixth wires, disposed on the third region is smaller than the size of the first openings.

* * * * *